(12) United States Patent
Machado et al.

(10) Patent No.: US 10,370,958 B2
(45) Date of Patent: Aug. 6, 2019

(54) SYSTEMS AND METHODS FOR LOCALLY PERFORMING WELL TESTING

(71) Applicant: ROCKWELL AUTOMATION ASIA PACIFIC BUSINESS CENTER PTE. LTD., Singapore (SG)

(72) Inventors: Miguel Armando Machado, Villahermosa (MX); Srikanth G. Mashetty, Houston, TX (US); Mahesh Purohit, Bausher (OM); Hassan S. Suheil, Houston, TX (US)

(73) Assignee: Rockwell Automation Asia Pacific Business Center PTE, LTD., Singapore (SG)

( * ) Notice: Subject to any disclaimer, the term of this patent is extended or adjusted under 35 U.S.C. 154(b) by 507 days.

(21) Appl. No.: 14/179,266

(22) Filed: Feb. 12, 2014

(65) Prior Publication Data

US 2015/0226051 A1    Aug. 13, 2015

(51) Int. Cl.
| | |
|---|---|
| *E21B 43/12* | (2006.01) |
| *E21B 47/10* | (2012.01) |
| *E21B 47/06* | (2012.01) |
| *E21B 49/08* | (2006.01) |

(52) U.S. Cl.
CPC ............ *E21B 47/10* (2013.01); *E21B 43/12* (2013.01); *E21B 47/06* (2013.01); *E21B 49/08* (2013.01)

(58) Field of Classification Search
CPC ........ E21B 43/34; E21B 47/10; E21B 43/017; E21B 43/12; E21B 43/14; E21B 47/00; G01F 1/74; G01F 15/08; G01N 33/2823
See application file for complete search history.

(56) References Cited

U.S. PATENT DOCUMENTS

| | | | |
|---|---|---|---|
| 4,429,581 A * | 2/1984 | Furmaga et al. | .......... 73/861.04 |
| 4,616,700 A | 10/1986 | Wood et al. | |
| 4,660,414 A * | 4/1987 | Hatton et al. | ................ 73/61.44 |

(Continued)

FOREIGN PATENT DOCUMENTS

| | | |
|---|---|---|
| CN | 101333924 A | 12/2008 |
| WO | 2013006075 A1 | 1/2013 |

OTHER PUBLICATIONS

R. Cramer et al: "Well Text optimization and automation", Apr. 13, 2006 (Apr. 13, 2006), XP055263073, pp. 3,6.

(Continued)

*Primary Examiner* — Kipp C Wallace
(74) *Attorney, Agent, or Firm* — Fletcher Yoder, P.C.

(57) ABSTRACT

A method for locally performing a well test may include receiving, at a processor, data associated with a flow of hydrocarbons directed into an output pipe via a multi-selector valve configured to couple to one or more hydrocarbon wells. The method may also include determining one or more virtual flow rates of the liquid and gas components based on the data. The method may then send a signal to a separator configured to couple to the output pipe, wherein the signal is configured to cause the separator to perform a well test for a respective well when the virtual flow rates of the liquid and gas components do not substantially match well test data associated with the respective well, wherein the well test data comprises one or more flow rates of the liquid and gas components determined during a previous well test for the respective well.

20 Claims, 10 Drawing Sheets

(56) References Cited

U.S. PATENT DOCUMENTS

| | | | |
|---|---|---|---|
| 5,586,027 A * | 12/1996 | Carlson et al. | 702/6 |
| 6,561,041 B1 | 5/2003 | Eck | |
| 2008/0217005 A1* | 9/2008 | Stluka et al. | 166/250.01 |
| 2010/0023269 A1 | 1/2010 | Yusti et al. | |
| 2011/0072316 A1* | 3/2011 | Chan | G06F 11/2284 714/48 |
| 2012/0095733 A1* | 4/2012 | Rossi | 703/2 |
| 2014/0150520 A1* | 6/2014 | Khan | 73/1.35 |

OTHER PUBLICATIONS

Ron Cramer et al: "Less Footprints in the Snow for Salym Field in Western Siberia", SPE, Sep. 22, 2010 (Sep. 22, 2010), XP055263063, abstract, figures 2-3, pp. 3-4, 9.
Extended EP Search Report for EP Application No. 15154817.9 dated Aug. 5, 2016; 14 Pages.
Chinese Office Action for CN Application No. 201510076759.2 dated Apr. 1, 2017; 12 Pages.

* cited by examiner

SYSTEMS AND METHODS FOR LOCALLY PERFORMING WELL TESTING

BACKGROUND

The present disclosure relates generally to monitoring various properties at a hydrocarbon well site and controlling various operations related to the monitored hydrocarbon well site. More specifically, the present disclosure relates to providing a local system for monitoring the various attributes at the hydrocarbon well site and making decisions regarding controlling various attributes of the hydrocarbon well site, controlling the flow of hydrocarbons from the hydrocarbon well site, or optimizing the production of hydrocarbons at the hydrocarbon well site.

As hydrocarbons are extracted from hydrocarbon reservoirs via hydrocarbon wells in oil and/or gas fields, the extracted hydrocarbons may be transported to various types of equipment, tanks, and the like via a network of pipelines. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

Information related to the extracted hydrocarbons or related to the equipment transporting, storing, or processing the extracted hydrocarbons may be gathered at the well site or at various locations along the network of pipelines. This information or data may be used to ensure that the well site or pipelines are operating safely and that the extracted hydrocarbons have certain desired qualities (e.g., flow rate, temperature). The data related to the extracted hydrocarbons may be acquired using monitoring devices that may include sensors that acquire the data and transmitters that transmit the data to computing devices, routers, other monitoring devices, and the like, such that well site personnel and/or off-site personnel may view and analyze the data.

Generally, the data available to well site personnel may not be presented in a manner in which the well site personnel may use to control, analyze, or optimize the hydrocarbon production at a well site (i.e., on site). That is, to optimize hydrocarbon production at the well site, well site personnel should quickly analyze data available at the well site and make decisions regarding the operations at the well site based on the analysis of the data. However, the data available at the well site often includes raw data that may be too complex to interpret or analyze for making decisions regarding the operations at the well site. Accordingly, it is now recognized that improved systems and methods for monitoring various properties at a hydrocarbon well site, presenting the various properties, and controlling various operations related to the monitored hydrocarbon well site are desirable.

BRIEF DESCRIPTION

In one embodiment, a system may include a multi-selector valve that may couple to one or more wells that extract hydrocarbons from one or more hydrocarbon reservoirs. The multi-selector valve may divert a flow of hydrocarbons extracted from a first well into an output pipe. The system may also include a separator that couples to the output pipe and separates the hydrocarbons into gas and liquid components. The system may also include a monitoring device that communicatively couples to the multi-selector valve and the separator. The monitoring devices may receive a first set of data associated with the flow of hydrocarbons in the output pipe, determine one or more virtual flow rates of the liquid and gas components based on the first set of data, and perform a well test for a respective well when the virtual flow rates of the liquid and gas components do not substantially match well test data associated with the respective well. In this case, the well test data includes one or more flow rates of the liquid and gas components determined during a previous well test for the respective well.

In another embodiment, a method for locally performing a well test may include receiving, at a processor, data associated with a flow of hydrocarbons directed into an output pipe via a multi-selector valve configured to couple to one or more hydrocarbon wells. The method may also include determining one or more virtual flow rates of the liquid and gas components based on the data. The method may then send a signal to a separator configured to couple to the output pipe, wherein the signal is configured to cause the separator to perform a well test for a respective well when the virtual flow rates of the liquid and gas components do not substantially match well test data associated with the respective well, wherein the well test data comprises one or more flow rates of the liquid and gas components determined during a previous well test for the respective well.

In yet another embodiment, an electronic device may include an input/output port that receives a first set of data from one or more sensors disposed on an output pipe that receives a flow of hydrocarbons from one of a plurality of hydrocarbon wells. The plurality of hydrocarbon wells may be coupled to a multi-selector valve that isolates the flow of the one of the plurality of hydrocarbon wells to the output pipe via an internal piping system. The electronic device may also include a processor that may determine one or more virtual flow rates of one or more liquid and gas components of the one of the plurality of hydrocarbon wells based on the first set of data. The processor may transmit the virtual flow rates to a gateway device that may determine whether the virtual flow rates of the liquid and gas components substantially match one or more flow rates of the liquid and gas components determined during a previous well test for the one of the plurality of hydrocarbon wells.

DRAWINGS

These and other features, aspects, and advantages of the present invention will become better understood when the following detailed description is read with reference to the accompanying drawings in which like characters represent like parts throughout the drawings, wherein.

Figure 1:
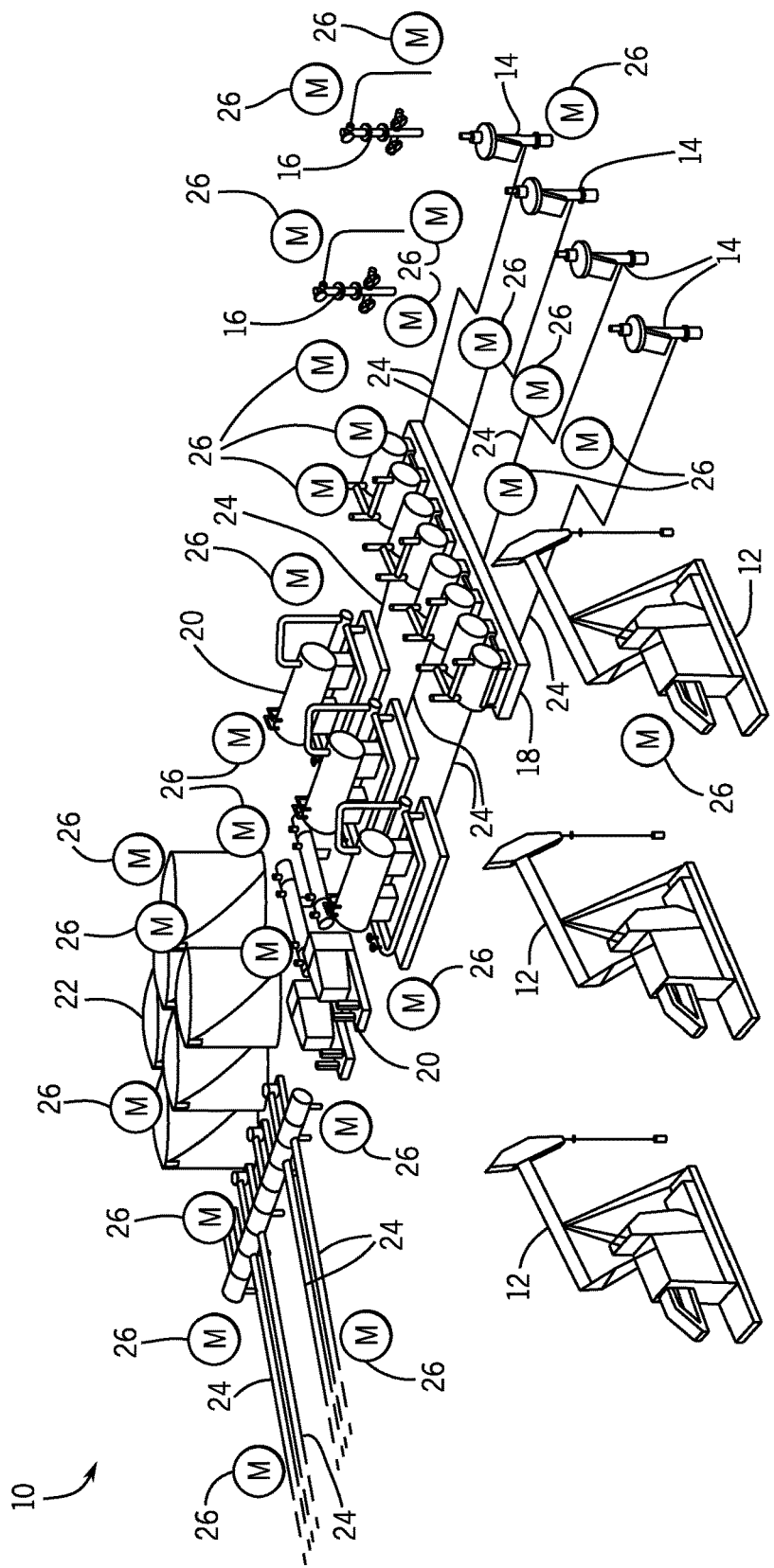
FIG. 1 illustrates a schematic diagram of an example hydrocarbon site that may produce and process hydrocarbons, in accordance with embodiments presented herein.
Figure 13:
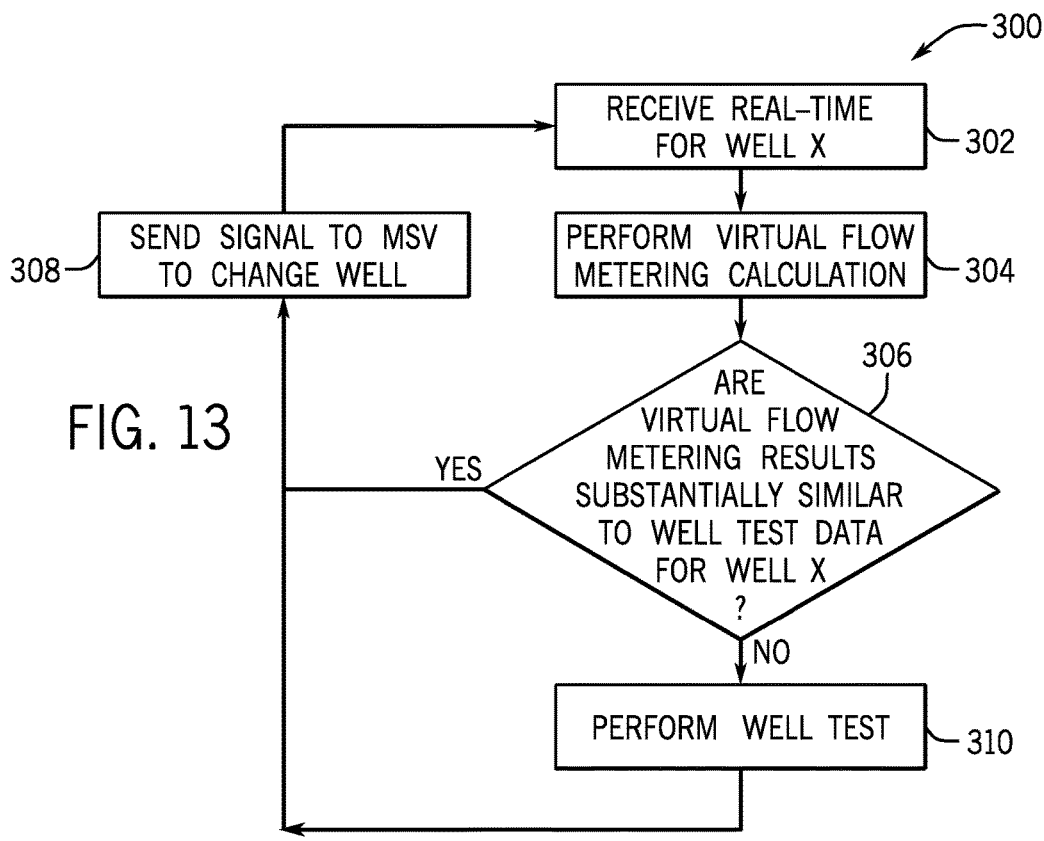
Figure 12:
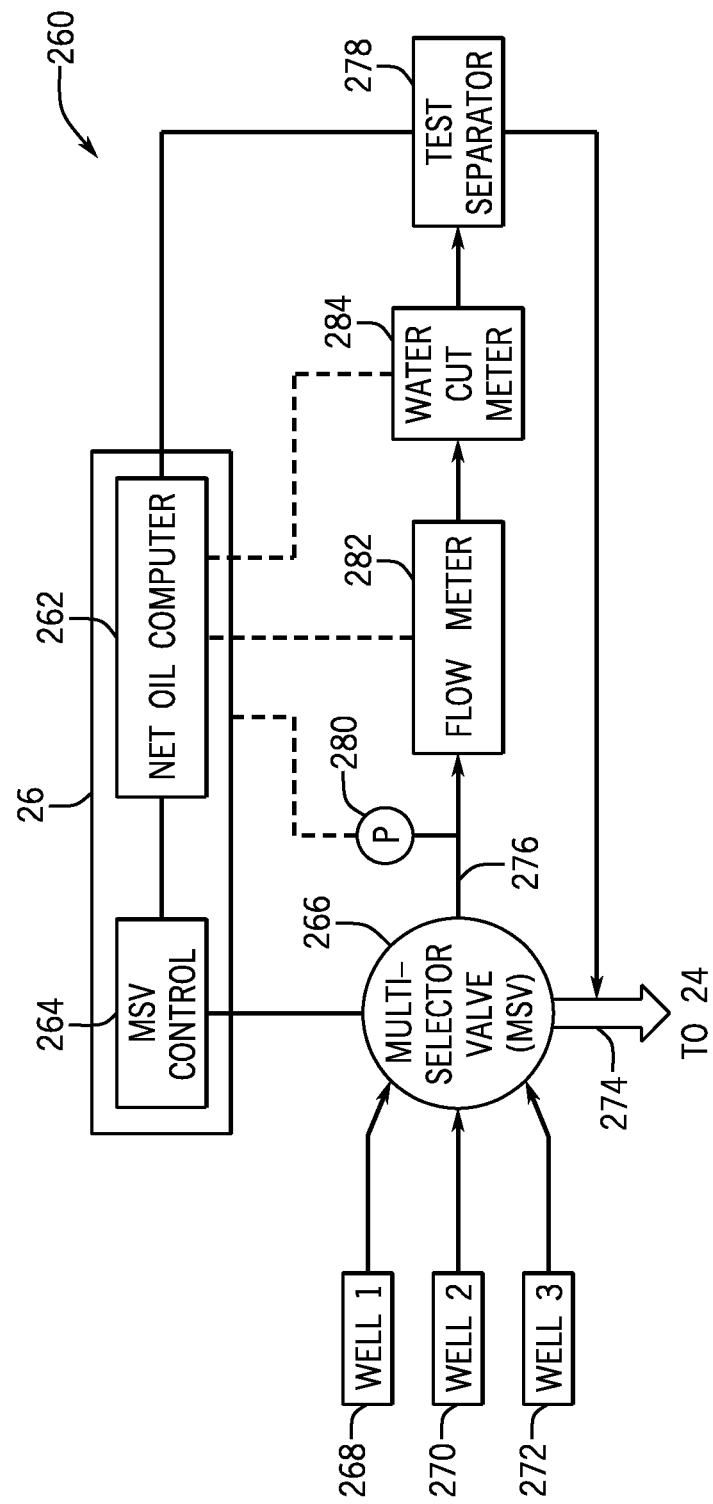

FIG. 12 illustrates a block diagram of a net oil computer (NOC) system that may be used in the hydrocarbon site of FIG. 1, in accordance with embodiments presented herein; and FIG. 13 illustrates a flow chart of a method for automatically performing a well test on a well in the hydrocarbon site of FIG. 1 based on monitored properties of the hydrocarbons being extracted from the well, in accordance with embodiments presented herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards improved systems and methods for providing hydrocarbon production analysis data at a hydrocarbon well site in real time or near real time. Moreover, embodiments of the present disclosure are related to improved systems and methods for controlling hydrocarbon production operations at the hydrocarbon well site based on the hydrocarbon production analysis data received at real time or near real time.

Generally, during hydrocarbon exploitation operations, well site personnel often encounter numerous challenges when attempting to optimize or increase the production of hydrocarbons at the hydrocarbon well site. For instance, complex information presented in raw data form may be assimilated and understood by a well site operator prior to the operator making accurate decisions with regard to operating a well at the well site. As such, data acquired at the hydrocarbon well site may be collected and transmitted to an offline data processing facility, where the collected data may be analyzed, such that detailed production reports may be generated. In certain embodiments, the offline data processing facility may analyze the collected data from the hydrocarbon well site with respect to data associated with a number of other hydrocarbon well sites. As such, using all of the data acquired at the hydrocarbon well sites, the offline data processing facility may generate the detailed production reports that may characterize the hydrocarbon production properties for each well at the respective hydrocarbon well site. A well operator may then determine certain well production parameters for each respective well based on the hydrocarbon production properties. That is, the operator may interpret or analyze the hydrocarbon production properties at a respective well and may modify certain operating parameters (e.g., wellhead pressure, choke size, separator pressure, flowline pressure, etc.) at the respective well to maximize the efficiency and/or production of the respective well.

Although the offline data processing facility may provide accurate reports and details regarding the hydrocarbon production properties, the offline data processing facility often uses a large amount of time (e.g., hours, days) to process the data acquired from each hydrocarbon well site. As such, if certain production attributes at a respective hydrocarbon well site changes, an operator of the respective hydrocarbon well site may not be aware of the changes until the operator receives an updated report detailing the updated hydrocarbon production properties of the respective hydrocarbon well site from the offline processing facility. Since the offline processing facility does not provide data analysis or the hydrocarbon production properties in real time or near real time, the hydrocarbons at the respective hydrocarbon well site may not be efficiently extracted until the operator changes the operating parameters of the respective well in view of the updated hydrocarbon production properties of the respective hydrocarbon well site.

Keeping the foregoing in mind, in certain embodiments, a monitoring system disposed at a hydrocarbon well site and may monitor various properties associated with a respective well at the hydrocarbon well site, analyze the monitored properties, and provide certain data analysis and/or visualizations (e.g., plots) that may assist a well operator to control various operating parameters of the respective well. As a result, the monitoring system may provide real time or near real time analysis of data associated with the respective well at the hydrocarbon well site. In one embodiment, the monitoring system may automatically adjust certain operating parameters of the respective well based on the data analysis. In this manner, the operating parameters of the respective well may be modified in real time or near real time to ensure that the hydrocarbons at the respective well are being efficiently produced.

Generally, the monitoring system may monitor various properties associated with the respective well using a relatively low amount of power. However, the monitoring system may use additional amounts of power when controlling the operating parameters of the well. As such, in certain embodiments, the monitoring system may provide different functions and may perform different operations based on the amount of power that may be available.

In addition to the aforementioned features of the monitoring systems, the monitoring system may automatically initiate a well test for a well when the hydrocarbons extracted from the well do not meet certain criteria. As such, the monitoring system may be communicatively coupled to a selector valve that may isolate the hydrocarbon production from one particular well, such that the flow of hydrocarbons from the well is directed to a separator. The monitoring system may also be communicatively coupled to the separator to receive the results of the well test data. When automatically initiating a well test for a respective well, the monitoring system may monitor various properties associated with the hydrocarbon production from a particular well. The monitoring system may then compare the monitored properties of the hydrocarbon production with historical well test data for the same well. If the monitored properties are not within some range of values as indicated in the well test data, the monitoring system may initiate a well test for the respective well.

Additional details with regard to the monitoring system analyzing data associated with a well, providing real time or near real time analysis of data or control of various operating parameters of the well, operating in different power modes, and initiating well tests for a well will be discussed below with reference to FIGS. 1-13.

By way of introduction, FIG. 1 illustrates a schematic diagram of an example hydrocarbon site 10. The hydrocarbon site 10 may be an area in which hydrocarbons, such as crude oil and natural gas, may be extracted from the ground, processed, and stored. As such, the hydrocarbon site 10 may include a number of wells and a number of well devices that may control the flow of hydrocarbons being extracted from the wells. In one embodiment, the well devices in the hydrocarbon site 10 may include pumpjacks 12, submersible pumps 14, well trees 16, and the like. After the hydrocarbons are extracted from the surface via the well devices, the extracted hydrocarbons may be distributed to other devices such as wellhead distribution manifolds 18, separators 20, storage tanks 22, and the like. At the hydrocarbon site 10, the pumpjacks 12, submersible pumps 14, well trees 16, wellhead distribution manifolds 18, separators 20, and storage tanks 22 may be connected together via a network of pipelines 24. As such, hydrocarbons extracted from a reservoir may be transported to various locations at the hydrocarbon site 10 via the network of pipelines 24.

The pumpjack 12 may mechanically lift hydrocarbons (e.g., oil) out of a well when a bottom hole pressure of the well is not sufficient to extract the hydrocarbons to the surface. The submersible pump 14 may be an assembly that may be submerged in a hydrocarbon liquid that may be pumped. As such, the submersible pump 14 may include a hermetically sealed motor, such that liquids may not penetrate the seal into the motor. Further, the hermetically sealed motor may push hydrocarbons from underground areas or the reservoir to the surface.

The well trees 16 or Christmas trees may be an assembly of valves, spools, and fittings used for natural flowing wells. As such, the well trees 16 may be used for an oil well, gas well, water injection well, water disposal well, gas injection well, condensate well, and the like. The wellhead distribution manifolds 18 may collect the hydrocarbons that may have been extracted by the pumpjacks 12, the submersible pumps 14, and the well trees 16, such that the collected hydrocarbons may be routed to various hydrocarbon processing or storage areas in the hydrocarbon site 10.

The separator 20 may include a pressure vessel that may separate well fluids produced from oil and gas wells into separate gas and liquid components. For example, the separator 20 may separate hydrocarbons extracted by the pumpjacks 12, the submersible pumps 14, or the well trees 16 into oil components, gas components, and water components. After the hydrocarbons have been separated, each separated component may be stored in a particular storage tank 22. The hydrocarbons stored in the storage tanks 22 may be transported via the pipelines 24 to transport vehicles, refineries, and the like.

The hydrocarbon site 10 may also include monitoring systems 26 that may be placed at various locations in the hydrocarbon site 10 to monitor or provide information related to certain aspects of the hydrocarbon site 10. As such, the monitoring system 26 may be a controller, a remote terminal unit (RTU), or any computing device that may include communication abilities, processing abilities, and the like. The monitoring system 26 may include sensors or may be coupled to various sensors that may monitor various properties associated with a component at the hydrocarbon site 10. The monitoring system 26 may then analyze the various properties associated with the component and may control various operational parameters of the component. For example, the monitoring system 26 may measure a pressure or a differential pressure of a well or a component (e.g., storage tank 22) in the hydrocarbon site 10. The monitoring system 26 may also measure a temperature of contents stored inside a component in the hydrocarbon site 10, an amount of hydrocarbons being processed or extracted by components in the hydrocarbon site 10, and the like. The monitoring system 26 may also measure a level or amount of hydrocarbons stored in a component, such as the storage tank 22. In certain embodiment, the monitoring systems 26 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by vMonitor® of Houston, Tex.

In one embodiment, the monitoring system 26 may include a sensor that may measure pressure, temperature, fill level, flow rates, and the like. The monitoring system 26 may also include a transmitter, such as a radio wave transmitter, that may transmit data acquired by the sensor via an antenna or the like. In one embodiment, the sensor in the monitoring system 26 may be wireless sensors that may be capable of receive and sending data signals between monitoring systems 26. To power the sensors and the transmitters, the monitoring system 26 may include a battery or may be coupled to a continuous power supply. Since the monitoring system 26 may be installed in harsh outdoor and/or explosion-hazardous environments, the monitoring system 26 may be enclosed in an explosion-proof container that may meet certain standards established by the National Electrical Manufacturer Association (NEMA) and the like, such as a NEMA 4X container, a NEMA 7X container, and the like.

The monitoring system 26 may transmit data acquired by the sensor or data processed by a processor to other monitoring systems, a router device, a supervisory control and data acquisition (SCADA) device, or the like. As such, the monitoring system 26 may enable users to monitor various properties of various components in the hydrocarbon site without being physically located near the corresponding components.

Figure 2:
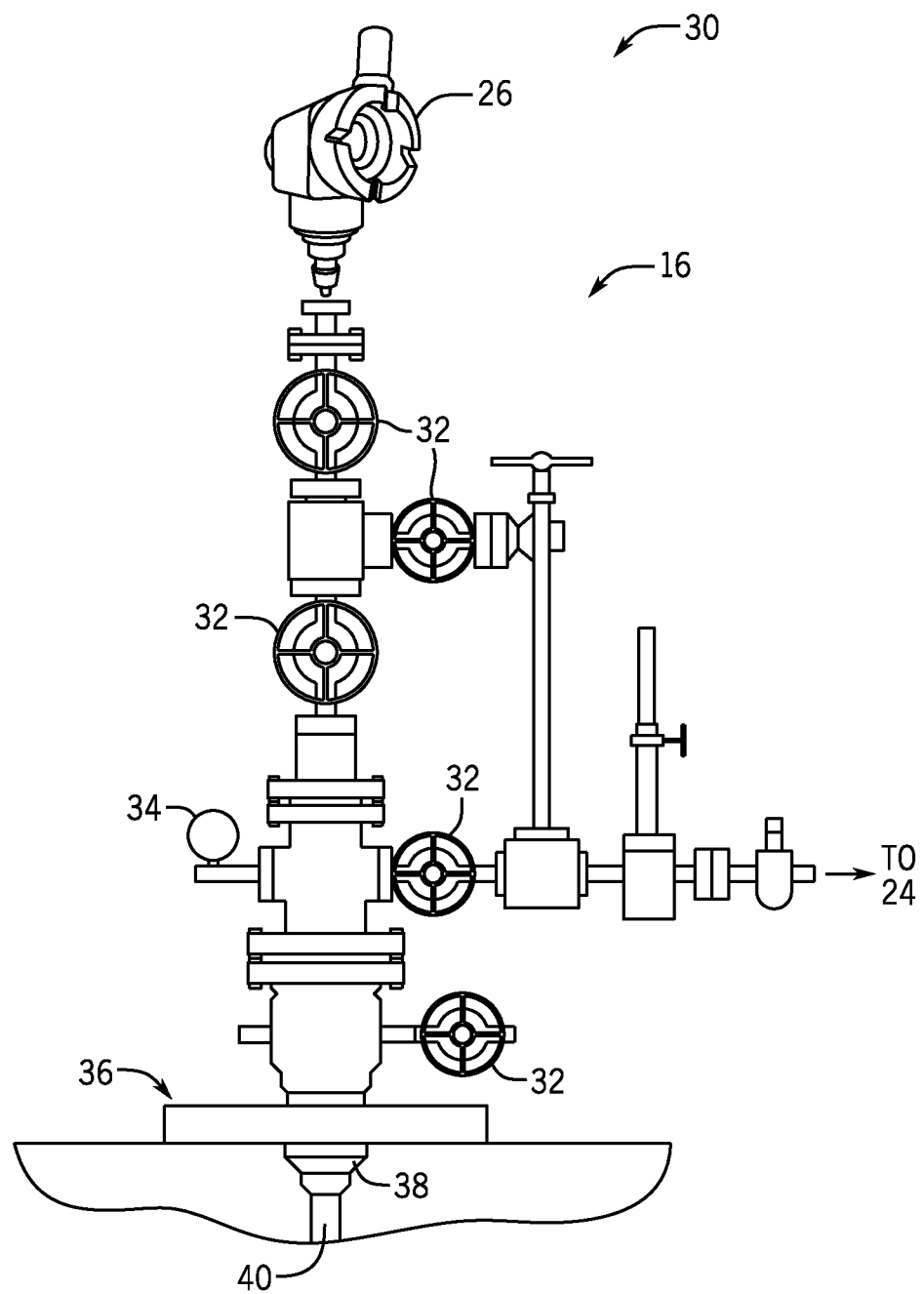
FIG. 2 illustrates a front view of an example well-monitoring system used in the hydrocarbon site of FIG. 1, in accordance with embodiments presented herein.

Keeping the foregoing in mind, FIG. 2 illustrates an example of a well-monitoring system 30 that includes the monitoring system 26 and the well tree 16. Although the well-monitoring system 30 is illustrated as the monitoring system 26 coupled to the well tree 16, it should be noted that the monitoring system 26 may be coupled to any well device or may be coupled to another free-standing structure.

Referring now to FIG. 2, the well tree 16 may include a number of valves 32 that may control the flow of the extracted hydrocarbons to the network of pipelines 24 and the like. The well tree 16 may also include various gauges 34 that may receive information related to the pressure, temperature, flow, and other attributes associated with the well tree 16. A portion of the well tree 16 that meets the surface of the Earth may correspond to a wellhead 36. The wellhead 36 may be coupled to a casing 38 and a tubing 40. Generally, the wellhead 36 may include various components and structures to support the casing 38 and the tubing 40 being routed into a borehole of the well. Moreover, the wellhead 36 also provides a structure at which the well tree 16 may be attached to the casing 38 and the tubing 40.

The casing 38 may be a large diameter pipe that is assembled and inserted into a drilled section of a borehole and may be held into place with cement. The tubing 40 may be placed within the casing 38 and may include a tube used in the borehole in which hydrocarbons may be extracted from a reservoir.

In one embodiment, the monitoring system 26 may receive real-time or near real-time data associated with the wellhead 30 such as, for example, tubing head pressure, tubing head temperature, case head pressure, flowline pressure, wellhead pressure, wellhead temperature, and the like. The monitoring system 26 may receive the real-time data from the gauges 34, sensors disposed in the casing 38, sensors disposed in the tubing 40, and the like. In any case, the monitoring system 26 may analyze the real-time data with respect to static data that may be stored in a memory of the monitoring system 26. The static data may include a well depth, a tubing length, a tubing size, a choke size, a reservoir pressure, a bottomhole temperature, well test data, fluid properties of the hydrocarbons being extracted, and the like. The monitoring system 26 may also analyze the real-time data with respect to other data acquired by various types of instruments (e.g., water cut meter, multiphase meter) to determine an inflow performance relationship (IPR) curve, a desired operating point for the wellhead 30, key performance indicators (KPIs) associated with the wellhead 30, wellhead performance summary reports, and the like.

Figure 3:
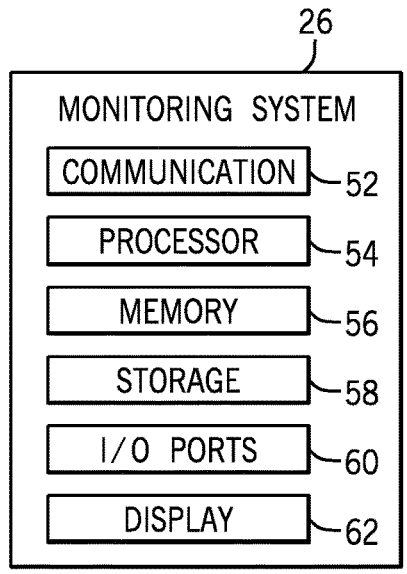
FIG. 3 illustrates a block diagram of a monitoring system that may be employed in the hydrocarbon site of FIG. 1, in accordance with embodiments presented herein.

Keeping this in mind, FIG. 3 illustrates a block diagram of various components that may be part of the monitoring system 26 and may be used by the monitoring system 26 to perform various analysis operations. As shown in FIG. 3, the monitoring system 26 may include a communication component 52, a processor 54, a memory 56, a storage 58, input/output (I/O) ports 60, a display 62, and the like. The communication component 52 may be a wireless or wired communication component that may facilitate communication between different monitoring systems 26, gateway communication devices, various control systems, and the like. The processor 54 may be any type of computer processor or microprocessor capable of executing computer-executable code. The memory 56 and the storage 58 may be any suitable articles of manufacture that can serve as media to store processor-executable code, data, or the like. These articles of manufacture may represent computer-readable media (i.e., any suitable form of memory or storage) that may store the processor-executable code used by the processor 34 to perform the presently disclosed techniques. The memory 56 and the storage 58 may also be used to store data received via the I/O ports 60, data analyzed by the processor 54, or the like.

The I/O ports 60 may be interfaces that may couple to various types of I/O modules such as sensors, programmable logic controllers (PLC), and other types of equipment. For example, the I/O ports 60 may serve as an interface to pressure sensors, flow sensors, temperature sensors, and the like. As such, the monitoring system 26 may receive data associated with a well via the I/O ports 60. The I/O ports 60 may also serve as an interface to enable the monitoring system 26 to connect and communicate with surface instrumentation, flow meters, water cut meters, multiphase meters, and the like.

In addition to receiving data via the I/O ports 60, the monitoring system 26 may control various devices via the I/O ports 60. For example, the monitoring system 26 may be communicatively coupled to an actuator or motor that may modify the size of a choke that may be part of the well. The choke may control a fluid flow rate of the hydrocarbons being extracted at the well or a downstream system pressure within the network of pipelines 24 or the like. In one embodiment, the choke may be an adjustable choke that may receive commands from the monitoring system 26 to change the fluid flow and pressure parameters at the well.

The display 62 may include any type of electronic display such as a liquid crystal display, a light-emitting-diode display, and the like. As such, data acquired via the I/O ports and/or data analyzed by the processor 54 may be presented on the display 62, such that operators having access to the monitoring system 26 may view the acquired data or analyzed data at the hydrocarbon well site. In certain embodiments, the display 62 may be a touch screen display or any other type of display capable of receiving inputs from the operator.

Figure 4:
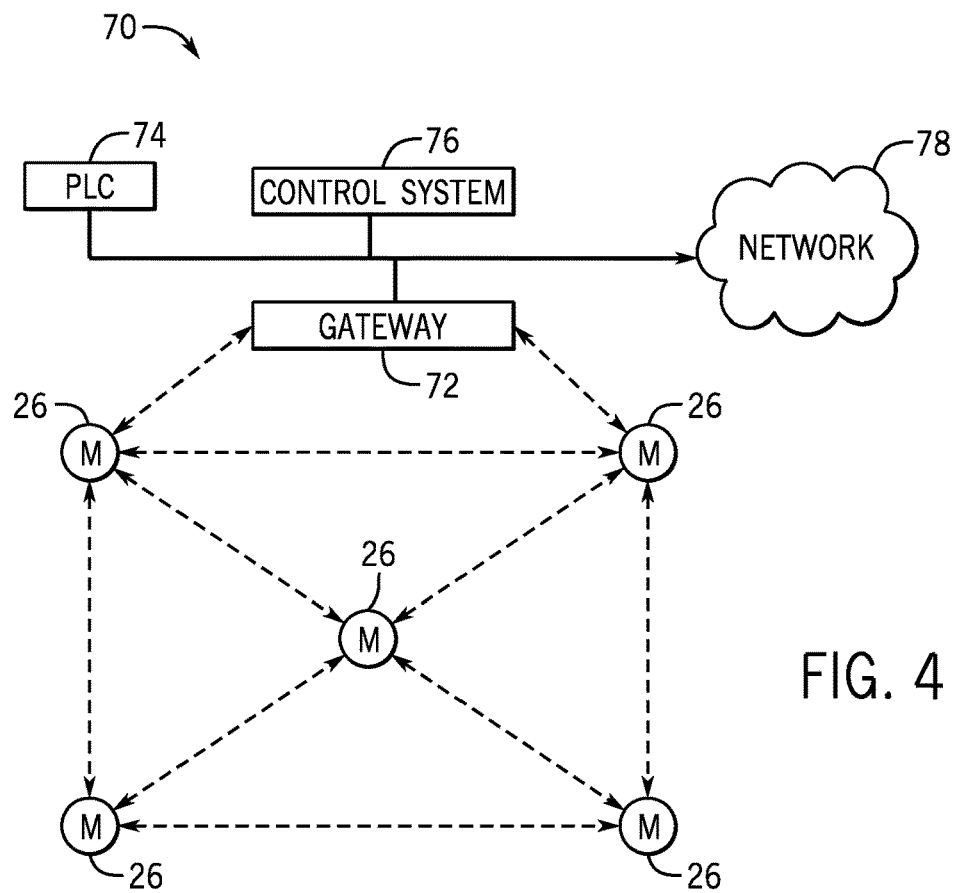
FIG. 4 illustrates a communication network that may be employed in the hydrocarbon site of FIG. 1, in accordance with embodiments presented herein.

Referring back to the communication component 52, the monitoring system 26 may use the communication component 52 to communicatively couple to various devices in the hydrocarbon site 10. FIG. 4, for instance, illustrates an example communication network 70 that may be employed in the hydrocarbon site 10. As shown in FIG. 4, each monitoring system 26 may be communicate with one or more other monitoring systems 26. That is, each monitoring system 26 may communicate with certain monitoring systems 26 that may be located within some range of the respective monitoring system 26. Each monitoring system 26 may communicate with each other via its respective communication component 52. As such, each monitoring system 26 may transfer raw data acquired at its respective location, analyzed data associated with a respective well, or the like to each other. In one embodiment, the monitoring systems 26 may route the data to a gateway device 72. The gateway device 72 may be a network device that may interface with other networks or devices that may use different communication protocols. As such, the gateway device 72 may include similar components as the monitoring components 26. However, since the gateway device 72 may not be located at the well site or coupled to a well device, the gateway device 72 may have a larger form factor as compared to the monitoring system 26. Additionally, since the gateway device 72 may receive and process data acquired from multiple monitoring systems 26, the gateway device 72 may use a larger battery or power source as compared to the monitoring system 26 to process the additional data. In this manner, the gateway device 72 may also include a larger and/or faster processor 54, a larger memory 56, and a larger storage 58, as compared to the monitoring system 26.

After receiving data from the monitoring systems 26, the gateway device 72 may provide the data from each monitoring system 26 to various types of devices, such as a programmable logic controller (PLC) 74, a control system 76, and the like. The PLC 74 may include a digital computer that may control various components or machines in the hydrocarbon site 10. The control system 76 may include a computer-controlled system that monitors the data received via the monitoring devices 26 and may and control various components in the hydrocarbon site 10 and various processes performed on the extracted hydrocarbons by the components. For example, the control system 76 may be a supervisory control and data acquisition (SCADA), which may control large-scale processes, such as industrial, infrastructure, and facility-based processes, that may include multiple hydrocarbon sites 10 separated by large distances.

The gateway device 22 may also be coupled to a network 78. The network 78 may include any communication network, such as the Internet or the like, that may enable the monitoring systems 26, the gateway 72, the PLC 74, the control system 76, and the like to communicate with other like devices.

As mentioned above, each monitoring system 26 may acquire data from various sensors disposed throughout a respective well, the hydrocarbon well site, and the like. To enable well site personnel (i.e., operators physically located at the well site) to ensure that the well is operating efficiently, the monitoring system 26 may perform some initial data analysis using the processor 54 and may output the results of the data analysis via the display 62. In certain embodiments, the monitoring device 26 may transmit the results of the data analysis to a handheld electronic device (e.g., mobile phone, tablet computer, laptop computer, etc.) via the communication component 52 using a communication protocol, such as Bluetooth® or any other wireless or wired protocol. After receiving the results of the data analysis via the display 62 or the handheld electronic device, the operator may modify various operating parameters of the well based on the results. That is, the operator may interpret the analyzed data and modify the operating parameters of the well to increase the efficiency at which the well may produce hydrocarbons. In one embodiment, the monitoring system 26 may automatically determine whether the operating parameters of the well are desirable based on the results of the data analysis to achieve a desired efficiency or operating point of the well.

Figure 5:
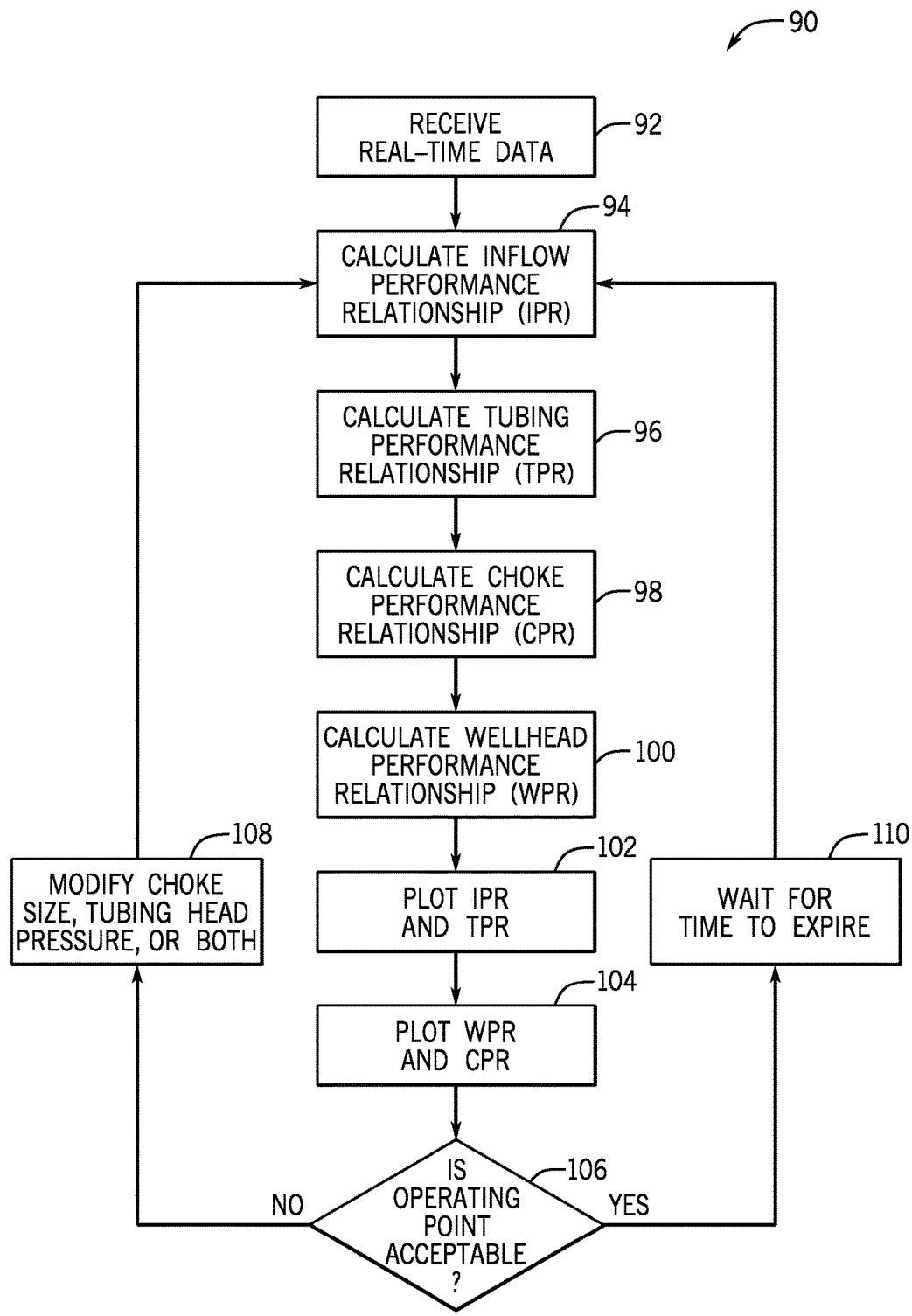
FIG. 5 illustrates a flow chart of a method for analyzing data acquired at a well and controlling various properties of the well in the hydrocarbon site of FIG. 1 based on the data acquired at the well, in accordance with embodiments presented herein.

Keeping this in mind, FIG. 5 illustrates a flowchart of a method 90 that the monitoring system 26 may employ for analyzing data associated with a respective well and controlling various properties of the respective well. The method 90 may be used for monitoring and/or controlling the operations of natural flowing wells or wells that use artificial lifts to extract hydrocarbons from a reservoir. In either case, since the monitoring system 26 is disposed at the well site, the operations of the well may be monitored, controlled, and operated locally. In this manner, the operations of the well may be optimized or monitored with or without an established communication link to gateway device 72, the PLC 74, the control system 76 (e.g., SCADA), the network 78, or the like.

Referring now to FIG. 5, at block 92, the monitoring system 26 may receive real-time (or near real-time) data from various sensors disposed throughout the respective well. The real-time data may include a tubing head pressure, a tubing head temperature, a casing head pressure, a flowline pressure, a wellhead pressure, a wellhead temperature, and the like.

The tubing head pressure may include a pressure measured at or near a location that correspond to where the tubing 40 may meet the surface in a well. In the same manner, the tubing head temperature may include a temperature measured at or near a location that correspond to where the tubing 40 may meet the surface in a well. The casing head pressure may include a pressure measured at or near a location that correspond to where the casing 38 may meet the surface in a well. The flowline pressure may include a pressure measured at or near a large diameter pipe, which may be a section of the casing 38. The large diameter pipe or flowline may be coupled to a mud tank that may receive drilling fluid as it comes out of a borehole. The wellhead pressure may include a pressure measured at or near a location that corresponds to the surface in a well. In this manner, the wellhead temperature may include a temperature measured at or near a location that corresponds to the surface in a well.

At block 94, the monitoring system 26 may calculate an inflow performance relationship (IPR) for the respective well. In one embodiment, the IPR may be a plot used in production engineering to assess a performance of a well. The plot may indicate a relationship between a well production rate and a flowrate of the hydrocarbons being extracted from the well. As such, the IPR may represent a performance of the reservoir that corresponds to the well that the monitoring system 26 may be monitoring. In one embodiment, the monitoring system 26 may determine the IPR based on certain known parameters associated with the well and the real-time data received at block 92. The known parameters associated with the well may include a well depth, a tubing length, a tubing size, a choke size, a reservoir pressure, a bottomhole temperature, well test data, fluid properties of the hydrocarbons being extracted, and the like. In one embodiment, the IPR may be calculated by evaluating the production rates of the well under various drawdown pressures. Additionally, when determining the shape of the IPR curve, the monitoring system 26 may account for the fluid composition of the hydrocarbons in the reservoir that corresponds to the well and the behavior of the fluid phases of the hydrocarbons being extracted under flowing conditions. As such, the monitoring system 26 may use well test information, reservoir data, and the real-time data received at block 92 to determine the IPR of a well. Generally, the IPR may change as the pressure at the reservoir associated with the well changes.

At block 96, the monitoring system may calculate a tubing performance relationship (TPR) for the respective well. In one embodiment, the TPR may be a plot used in production engineering to assess the performance of a completion string at a well. As such, the TPR may represent a performance of the pressure inside the tubing 40 as the flowrate of the hydrocarbons being produced at the respective well changes. The plot may indicate a relationship between a surface production rate of the hydrocarbons being produced and a flowing bottomhole pressure at the well. Additionally, when determining the shape of the TPR curve, the monitoring system 26 may account for the fluid composition of the hydrocarbons being extracted and behavior of the fluid phases in the completion design of the well. Generally, the TPR is used with the IPR calculated at block 94 to predict the performance of the respective well. Moreover, the TPR may change as the real-time pressure and temperature data received at block 92 changes.

At block 98, the monitoring system 16 may calculate a choke performance relationship (CPR) for the respective well. In one embodiment, the CPR may be a plot used in production engineering to assess the performance of a well with respect to the choke. As mentioned above, the choke may control a fluid flow rate of the hydrocarbons being extracted at the well. As such, the CPR plot may indicate a relationship between a pressure at the well exerted by the choke and a flowrate of the hydrocarbons being extracted at the well. Like the TPR discussed above, the CPR may change as the real-time pressure and temperature data received at block 92 changes.

At block 100, the monitoring system 16 may calculate a wellhead performance relationship (WPR) for the respective well. In one embodiment, the WPR may be a plot used in production engineering to assess the performance of a well at the wellhead. As such, the WPR plot may indicate a relationship between a pressure at the wellhead and a flowrate of the hydrocarbons being extracted at the well. Like the TPR and the CPR discussed above, the WPR may change as the real-time pressure and temperature data received at block 92 changes.

Figure 6:
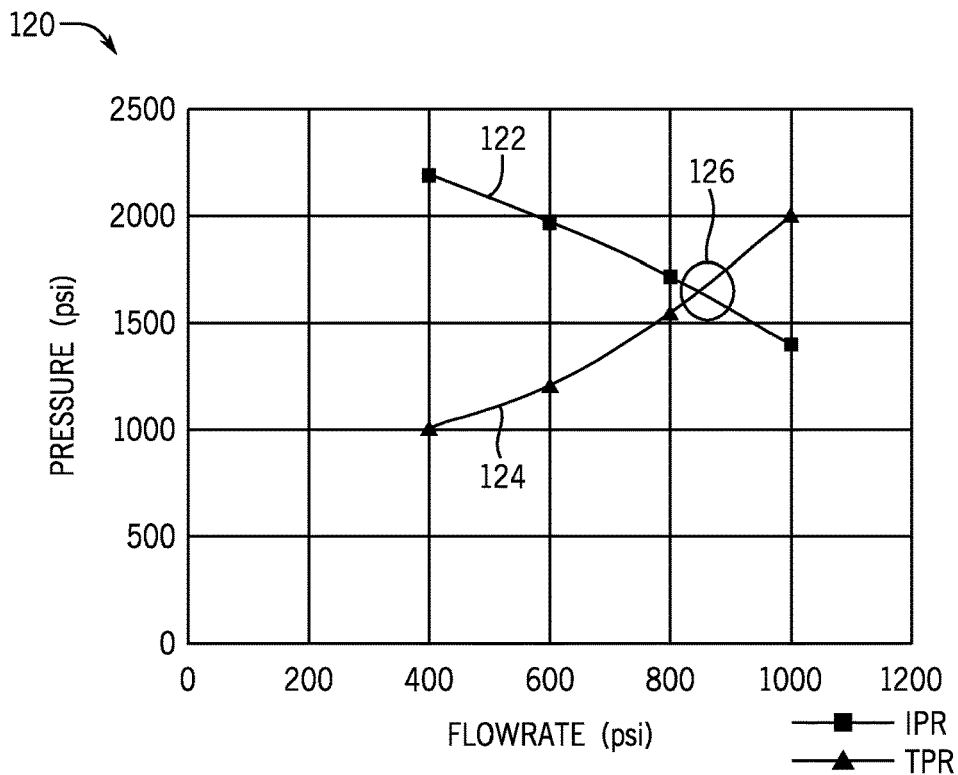
FIG. 6 illustrates example inflow performance relationship (IPR) and tubing performance relationship (TPR) curves output by a monitoring system positioned at a well site in the hydrocarbon site of FIG. 1, in accordance with embodiments presented herein.

At block 102, the monitoring system 26 may plot the IPR curve and the TPR curve on the same plot. FIG. 6 illustrates and example of an inflow and tubing relationship plot 120. As shown in FIG. 6, an IPR curve 122 may trend downward as a TPR curve 124 may trend upward. In certain embodiments, a desired operating point 126 for the respective well may correspond to the intersection of the IPR curve 122 and the TPR curve 124. In one embodiment, the desired operating point 126 may be set such that the respective well operates at approximately 80% of an absolute open flow (AOF) value. In any case, the desired operating point 126 may correspond to an optimum wellhead pressure and choke size that may allow for a maximum amount of hydrocarbon production for a particular tubing 40 and the present conditions of a reservoir that corresponds to the respective well.

Figure 7:
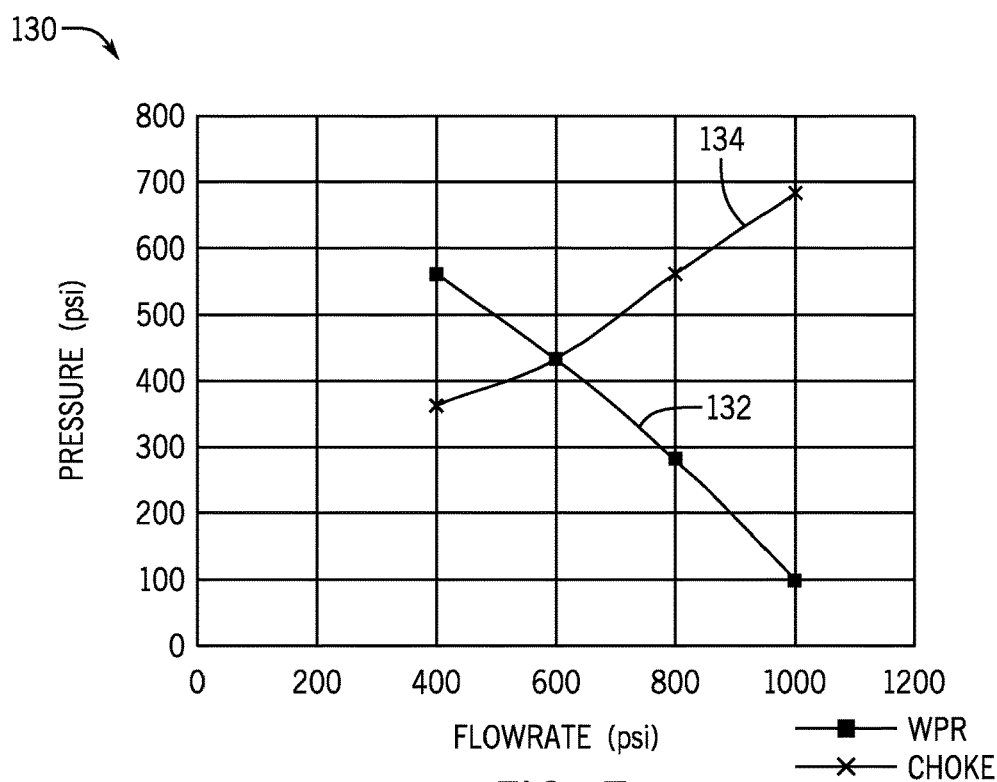
FIG. 7 illustrates example choke performance relationship (CPR) and wellhead performance relationship (WPR) curves output by a monitoring system positioned at a well site in the hydrocarbon site of FIG. 1, in accordance with embodiments presented herein.

Referring back to FIG. 4, at block 104, the monitoring system 26 may plot the WPR curve and the CPR curve on a second plot. FIG. 7 illustrates an example of a wellhead and choke relationship plot 130. As shown in FIG. 7, a WPR curve 132 may trend downward as a CPR curve 134 may trend upward.

Figure 8:
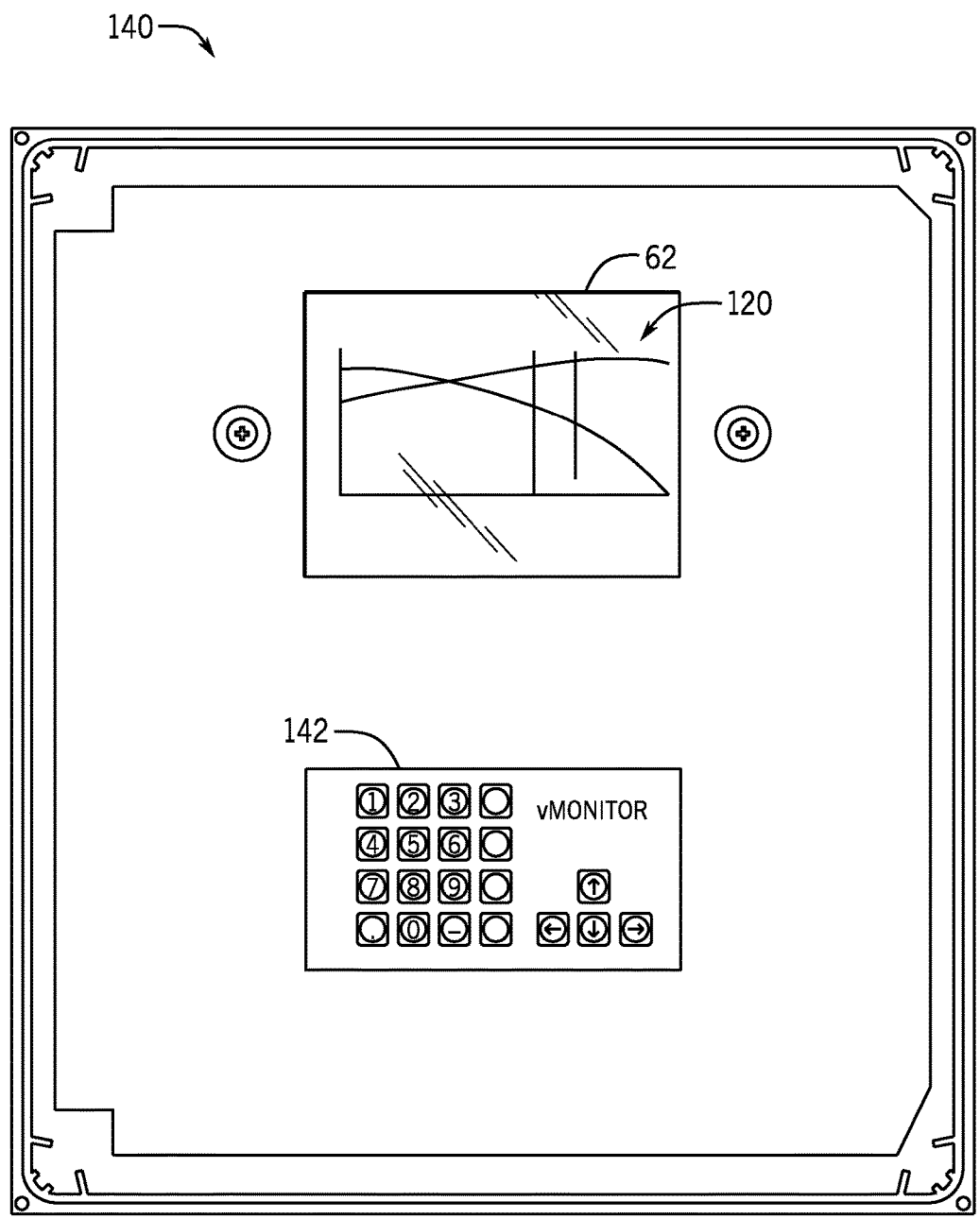
FIG. 8 illustrates a front view of an example monitoring system that includes a display for depicting the IPR curve, the TPR curve, the WPR curve, and/or the CPR curve of FIGS. 6 and 7, in accordance with embodiments presented herein.

In certain embodiments, the inflow and tubing relationship plot 120 and the wellhead and choke relationship plot 130 may be displayed directly on the display 62 of the monitoring system. As such, well site personnel may view analyzed data associated with the well, such that the data may be more useful to the viewer than viewing raw data associated with the well. That is, by viewing analyzed data (e.g., plots) at the well location, the well site personnel may make better decisions as to how to optimize the production of the well. For instance, FIG. 8 illustrates a front view 140 of the monitoring system 26 that includes the display 62 that depicts the inflow and tubing relationship plot 120. Since the monitoring system 26 may be disposed on or near the well as shown in FIG. 2, the well site personnel may view analyzed data associated with the production of the respective well in real or near-real time on the display 12. In this manner, the well site personnel may make determinations as to how various operating parameters of the well may be adjusted to increase the efficiency at which the hydrocarbons are being produced at the well. In one embodiment, the monitoring system 26 may include an interface 142 that the well site personnel may use to control the operating parameters of the well, the well device, or the like. For example, the monitoring system 26 may be communicatively coupled to a choke for the respective well and may control the pressure of the well by opening or closing the choke via input from the interface 142.

In addition to calculating the IPR, the TPR, the WPR, the CPR, and the aforementioned plots, the monitoring system 26 may store these data analysis results in the memory 56 or the storage 58. As such, a remote user may access the stored data of the monitoring system 26 via the communication network 70 or the like. In the same manner, the monitoring system 26 may push or transmit the raw data and/or the analyzed data to other monitoring systems 26, the gateway device 72, the PLC 74, the control system 76, the network 78, and the like via the communication network 70.

Referring again back to FIG. 4, at block 106, the monitoring system 26 may determine whether the current operating point of the respective well is acceptable. That is, the monitoring system 26 may determine whether the current operating point of the respective well corresponds to the desired operating point 126, as determined based on the intersection between the IPR curve 122 and the TPR curve 124. If the monitoring system 26 determines that the current operating point of the respective well does not correspond to the desired operating point 126, the monitoring system 26 may proceed to block 108.

At block 108, the monitoring system 26 may modify a size or opening of a choke associated with the respective well, a pressure of a tubing head associated with the respective well, or both, such that the current the operating point of the respective well moves towards the desired operating point 126. The choke may be located between the well and a flow line receiving the extracted hydrocarbons. The choke may control the flow and pressure between the well and the flow line. As such, the tubing pressure may also be controlled by adjusting the choke.

The monitoring system 26 may also control a well device and cause the well device to shut in the respective well for safety reasons and/or for optimization reasons. For instance, in the case of a gas-lifted well, when there is not enough gas to be allocated to all of the wells coupled to the gas-lift device, the wells that may be deemed to be the most efficient may receive priority for use of the gas-lift device over the other wells. In another embodiment, the monitoring system 26 may control a variable frequency drive to increase or decrease a speed of a pump of various types of artificially-lifted well systems. The monitoring system 26 may also control other variables at an injection side of a well or on the motor side of an artificially lifted well.

By modifying the choke size or any other variables, the monitoring system 26 may eliminate well heading. Moreover, by modifying the pressure of the tubing head or the wellhead pressure, the monitoring system 26 may modify the production rate of the hydrocarbons being produced. In certain embodiments, in addition to controlling the size of the choke and the pressure at the wellhead, the monitoring system 26 may also be communicatively coupled to a respective separator 20 and may adjust the pressure of the respective separator 20 to avoid choke freezing. The monitoring system 26 may also change a flowline pressure to keep a majority portion of the hydrocarbons being produced flowing through the choke.

In certain embodiments, the respective well may use an artificial lift, such as the pumpjacks 12 or the submersible pumps 14, to control a pressure of a reservoir that corresponds to the respective well, thereby controlling a flowrate of the hydrocarbons being extracted by the respective well. As such, in one embodiment, at block 108, the monitoring system 26 may adjust operational parameters of an artificial lift associated with the respective well, such that the current the operating point of the respective well moves towards the desired operating point 126.

Upon making any of the above-described modifications, the monitoring system 26 may return to block 94 and proceed with the subsequent blocks of the method 90 to determine whether the current operating point of the respective well corresponds to the desired operating point 126. As such, the monitoring system 26 may continuously monitor the operating point of the respective well and may modify the operations of the respective well based on real time data, such that the hydrocarbons produced at the respective well are produced efficiently.

Referring back to block 106, if the monitoring system 26 determines that the current operating point of the respective well does correspond to the desired operating point 126, the monitoring system 26 may proceed to block 110 and wait for some time to expire before returning to block 94 to proceed with the subsequent blocks of the method 90. In this manner, the monitoring system 26 may continuously monitor the current operating point of the respective well with respect to the desired operating point 126. If the desired operating point 126 of the respective well deviates from the current operating point, the monitoring system 26 may make modifications to the operating parameters of the well based on the real or near real time data, thereby ensuring that the hydrocarbons being produced at the well are being produced efficiently.

As mentioned above, FIG. 8 illustrates a front view 140 of the monitoring system 26 that includes the display 62 that depicts the inflow and tubing relationship plot 120. In addition to displaying plots, the monitoring system 26 may provide troubleshooting recommendations on the display 62 to assist the well site personnel in safely operating the respective well. For example, if the monitoring system 26 detects a wellhead pressure that exceeds some value, the monitoring system 26 may display a message in the display 62 indicating to the operator that holes may be present in the tubing 40.

Figure 9:
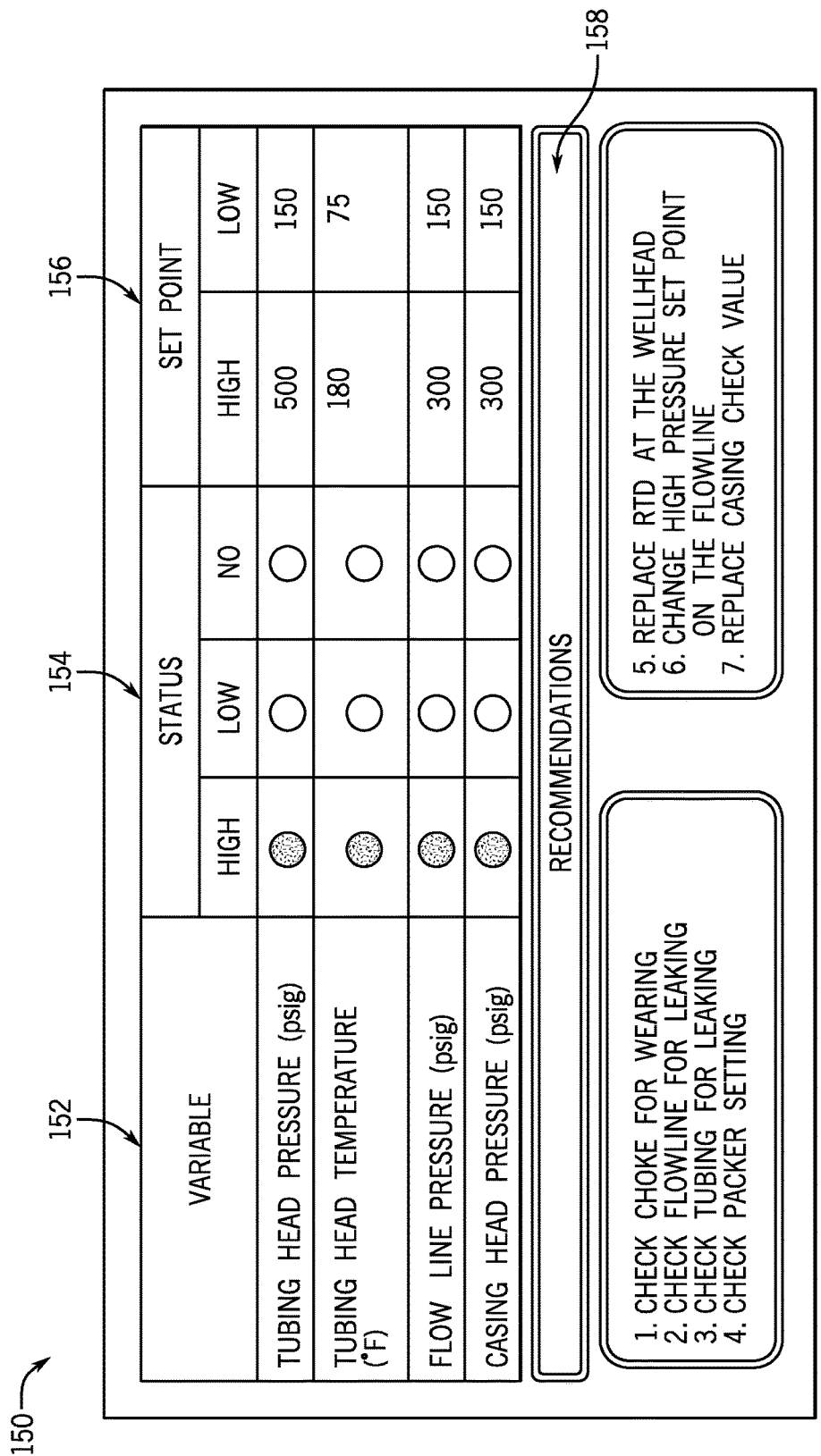
FIG. 9 illustrates an example alarm status screenshot that may be depicted in the display of the monitoring system of FIG. 3, in accordance with embodiments presented herein.

The monitoring system 26 may also provide visualizations to indicate alarm conditions to again assist the well site personnel in safely operating the respective well. FIG. 9, for instance, illustrates an alarm status screenshot 150 that may be depicted in the display 62 of the monitoring system 26. As shown in FIG. 9, the alarm status screenshot 150 may include a variable field 152, a status field 154, and a set point field 156. The variable field 152 may include one or more properties associated with the respective well being monitored. Example properties that may be listed in the variable field 152 may include a tubing head pressure, a tubing head temperature, a flowline pressure, and a casing head pressure.

The status field 154 may indicate whether any of the variables in the variable field 152 is experiencing an alarm condition. In one embodiment, the status field 154 may illuminate a respective graphic (e.g., different color icons, text depicted on the display 12, different color illuminated light-emitting diodes) when the received measurement of a respective property is above a high set point value (e.g., high alarm status), below a low set point value (e.g., low alarm status), or between the high and low set point values (e.g., no alarm status).

The set point field 156 may include input fields that may specify the high set point value and the low set point value. As such, the well site personnel may use the set point field 156 to provide parameters for causing alarm conditions. For instance, a user may enter a high set point value and a low set point value into the set point field 156, and the monitoring system 26 may indicate in the status field 154 an alarm condition when a measured value associated with the same property as the set point field 156 is above the high set point value or below the low set point value.

The alarm status screenshot 150 may also include a recommendations field 158. The recommendations field 158 may include a list of instructions or list of items for the well site personnel to examine based on the alarm conditions present at the respective well.

When providing the alarms, the recommendations, the well monitoring operations, and the well control operations discussed above, the monitoring system 26 may consume a large amount of power to perform all of these functions. However, since the monitoring system 26 may be disposed in areas where power sources may not be available, it may be useful to efficiently operate the monitoring system 26 based on the power sources available to the monitoring system 26. As such, in one embodiment, the monitoring system 26 may perform different levels of operations or functions based an amount of power that may be available to the monitoring system 26. That is, the monitoring system 26 may determine which operations or functions hat it may provide or perform based on an amount of power available.

Figure 10:
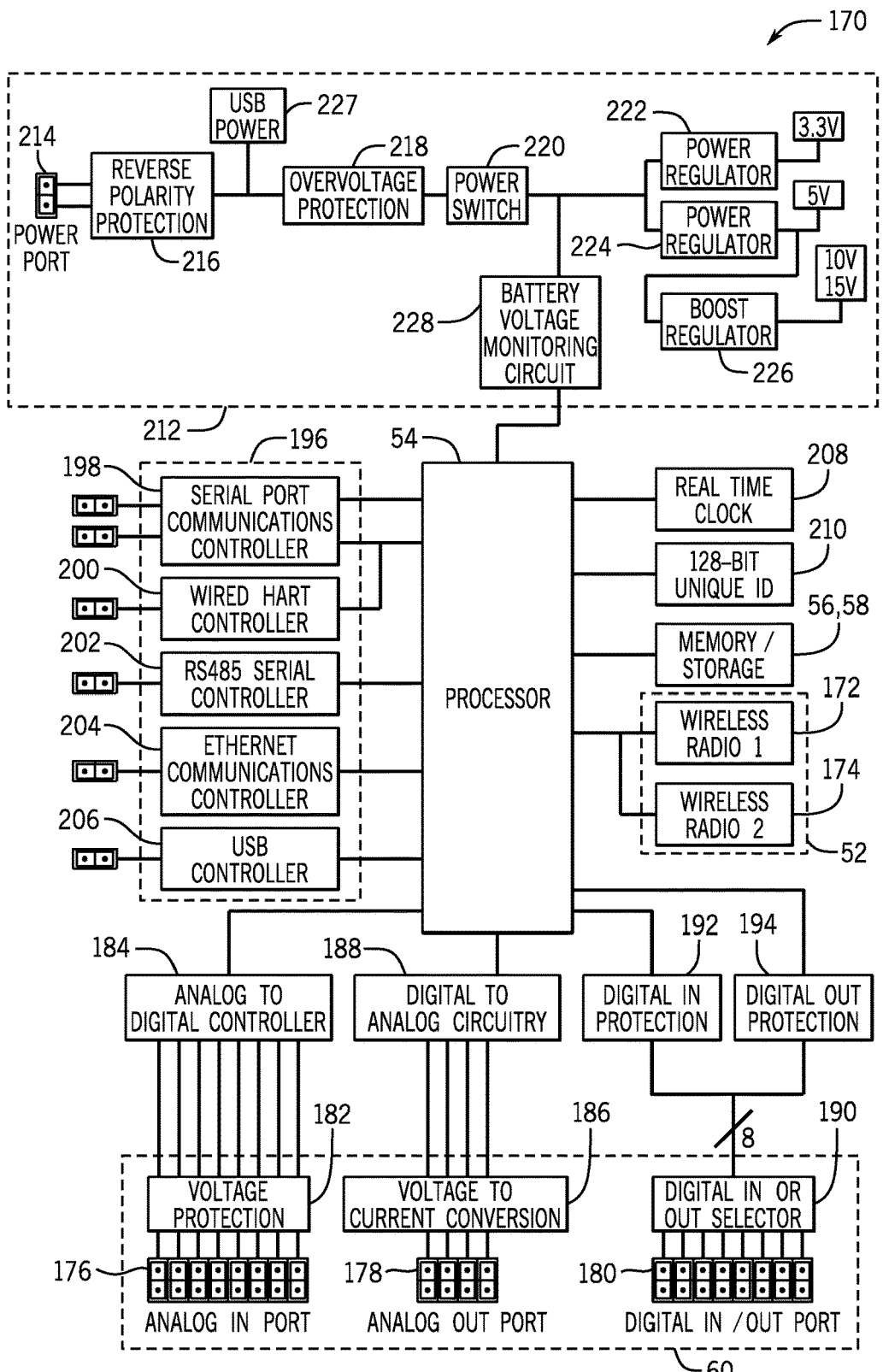
FIG. 10 illustrates a block diagram of a single board computer that may be used as the monitoring system of FIG. 3, in accordance with embodiments presented herein.

Keeping this in mind, FIG. 10 illustrates a block diagram of a single board computer 170 that may embody the monitoring system 26, which may be capable of performing different functions based on an amount of input voltage received by the single board computer 170. Although FIG. 10 depicts the monitoring system 26 as a single board computer, it should be understood that the single board computer embodiment of the monitoring system 26 is provided to serve as an example. That is, the monitoring system 26 is not limited to be embodied as a single board computer. Instead, as mentioned above, the monitoring system 26 may be may be a controller, a remote terminal unit (RTU), or any computing device (e.g., desktop computer, laptop computer, tablet computer, multiple board computer, etc.).

Figure 11:
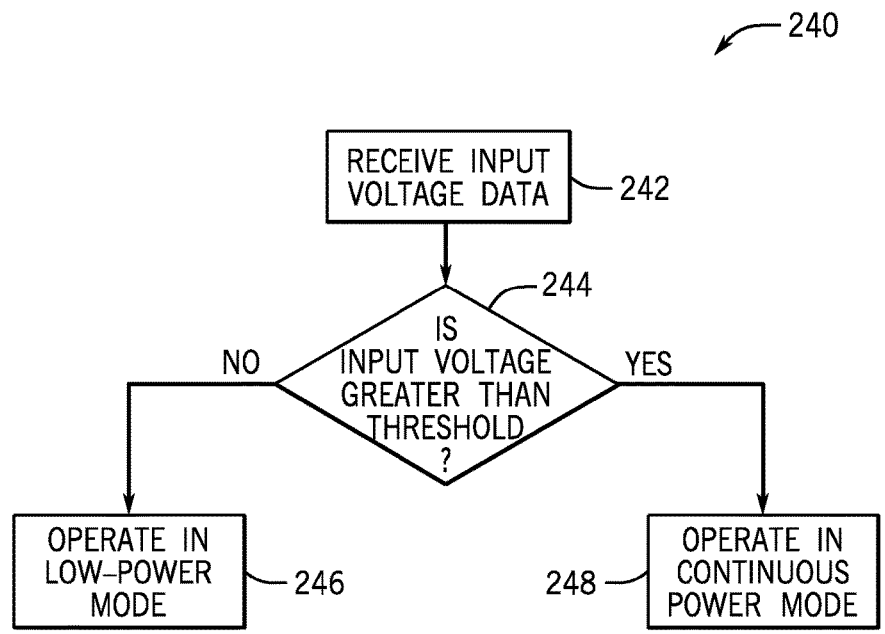
FIG. 11 illustrates a flow chart of a method for operating the monitoring system of FIG. 3 in different power modes, in accordance with embodiments presented herein.

Referring now to FIG. 11, the single board computer 170 may include the communication component 52, the processor 54, the memory 56, the storage 58, and the I/O ports 60 described above. In certain embodiments, the communication component 52 may include multiple wireless radios, which may transmit data received by the single board computer 170 to the gateway device 72, other monitoring systems 26, and the like. In one example, the single board computer 170 may include a wireless radio 172, such as a Zigbee® wireless radio, and a wireless radio 174, such as a Maxstream® wireless radio.

The I/O ports 60 of the single board computer 170 may include an analog input port 176, an analog output port 178, and a digital input/output (I/O) port 180. The analog input port 176 may be coupled to a voltage protection circuit 182, which may be coupled to an analog to digital controller 184. The analog output port 178 may be coupled to a voltage to current conversion circuit 186, which may be coupled to digital to analog circuitry 188. The digital I/O port 180 may be coupled to a digital input/output (I/O) selector circuit 170, which may be coupled to a digital input protection circuit 192 and a digital output protection circuit 194.

The analog to digital controller 184, the digital to analog circuitry 188, the digital input protection circuit 192, and the digital output protection circuit 194 may be coupled to the processor 54. As such, the processor 54 may receives inputs from various devices and send outputs to other devices using the appropriate circuitry and the appropriate I/O ports 60.

The single board computer 170 may also include a number of controllers 196, which may be coupled to the processor 54. For example, the controllers 196 may include a serial port communications controller 198, a wired HART® controller 200, an RS485 serial controller 202, an Ethernet communications controller 204, and a Universal Serial Bus (USB) controller 206. The controllers 196 may enable various types of devices and communication protocols to interact with the processor 54.

Additionally, the single board computer 170 may include a real time clock 208, which may be coupled to the processor 54. The real time clock 208 may provide the processor 54 a time reference. The single board computer 170 may also include a 128-bit identification number 210 that may be used to identify the particular board.

The single board computer 170 may also include a power circuit 212. The power circuit 212 may receive an input voltage that may be used to provide power to the single board computer 170. The power circuit 212 may include a power port 214 that may receive the voltage input from a battery or a continuous power supply.

The power circuit 212 may also include a reverse polarity protection circuit 216 and an overvoltage protection circuit 218. The reverse polarity protection circuit 216 and the overvoltage protection circuit 218 may protect the single board computer 170 from the effects of receiving an inverted input voltage signal or an input voltage signal that is greater than a rated voltage of the single board computer 170.

The power circuit 212 may also include a power switch 220 that may control whether the input voltage received at the power port 214 will be coupled to the processor 54. When the power switch 220 is in a closed position, the power circuit 212 may provide a regulated voltage of a number of voltages, such as 3.3V, 5V, 10V, or 15V. As such, the power circuit 212 may include a power regulator 222 and a power regulator 224, which may convert the input voltage into a specified output voltage. For example, the power regulator 222 may convert the input voltage into a 3.3V signal and the power regulator 224 may convert the input voltage into a 5V signal. The power circuit 212 may also include a boost regulator that may provide a larger voltage signal (e.g., 10V or 15V). In certain embodiments, the power circuit 212 may receive an input voltage within a range of values. For example, the power circuit 212 may receive an input voltage between 7V and 30V. As such, the power regulator 222, the power regulator 224, and the boost regulator 226 may convert any voltage within the range of values into a regulated voltage signal (e.g., 3.3V, 5V, 10V, 15V). Regardless of whether the power switch 220 is open or closed, the power circuit 212 may provide power to a Universal Serial Bus (USB) port 227.

In addition to providing various voltages to the single board computer 170, the power circuit 228 may monitor the input voltage received at the power port 214 to determine a type power source that may be coupled to the single computer board 170 or an amount of power that may be available to the single computer board 170. For example, the power circuit 228 may also include a battery voltage monitoring circuit 228 that may receive the input voltage via the power port 214 and determine whether the voltage source providing the input voltage corresponds to a 7.2V battery, a 24V battery, a continuous power source, or the like. The battery voltage monitoring circuit 228 may, in some embodiments, send information to the processor 54 that indicates the type of voltage source that is coupled to the power port 214 or the amount of power available for the single board computer 170.

Keeping the foregoing in mind, the processor 54 may provide different modes of operations for the monitoring system 26 based on the type of voltage source coupled to the single board computer 170 or the amount of input voltage or power available to the single board computer 170. For instance, FIG. 11 illustrates a flow chart of a method 240 that the monitoring system 26 (e.g., processor 54) may employ to operate in different power modes (e.g., low-power mode, high-power mode).

Referring now to FIG. 11, at block 242, the processor 54 may receive data indicating an input voltage received by the single board computer 170. In certain embodiments, the processor 54 may receive the data from the battery voltage monitoring circuit 228.

At block 244, the processor 54 may determine whether the input voltage is greater than some threshold (e.g., 10V). If the input voltage is not greater than the threshold, the processor 54 may proceed to block 246. At block 246, the processor 54 may operate in a low-power mode. By operating in the low-power mode, the processor 54 may limit the applications or functions performed by the single board computer 170. That is, the processor 54 may perform certain applications and not perform other application to conserve power. For instance, when the processor 54 is operating in the low-power mode, the processor 54 may just monitor various properties associated with the respective well and send the raw data that may include the various properties associated with the respective well to the gateway device 72 or the like via the communication component 52.

In another example, while operating in the low-power mode, the processor 54 may generate a first plot that includes the IPR and the TPR curves and a second plot that includes the WPR and the CPR curves, in addition to monitoring the raw data. In this manner, the well site personnel may still be able to adjust the operational parameters of the respective well by evaluating the IPR/TPR plot and the WPR/CPR plot.

Additionally, when operating in the low-power mode, the processor 54 may stop performing various operations or tasks that may use a substantial amount of power. For instance, when operating in the low-power mode, the processor 54 may stop driving 4-20 ma analog signals or voltage output analog signals that may be used to drive other components. As such, the monitoring system 26 may refrain from sending control signals to other components in the hydrocarbon site 10.

In certain embodiments, the processor 54 may not generate the IPR/TPR plot and the WPR/CPR plot when operating in the low-power mode. In this case, the processor 54 may send the raw data that may be used to generate the IPR/TPR plot and the WPR/CPR plot to the gateway device 72. The gateway device 72, which may be coupled to a larger power source, may then generate the IPR/TPR plot and the WPR/CPR plot for the respective well.

Referring back to block 244, if the input voltage is greater than the threshold, the processor 54 may proceed to block 248. At block 248, the processor 54 may operate in a continuous-power mode. By operating in the continuous-power mode, the processor 54 may not limit the applications or functions performed by the single board computer 170. That is, the processor 54 may perform all of the applications or functions that the single board computer 170 may be capable of performing. In other words, the processor 54 may not limit the operations of the single board computer 170 to conserve energy. For instance, when the processor 54 is operating in the continuous-power mode, the processor 54 may monitor various properties associated with the respective well, generate plots based on the monitored properties, and perform various types of analysis to control the operations of the respective well.

Referring briefly back to FIG. 5, when operating in the low-power mode, the processor 54 may perform the method 90 up to block 104 and may refrain from analyzing whether the operating point of the respective well is acceptable at block 106. However, when operating in the continuous-power mode, the processor 54 may perform the method 90 in its entirety. As such, the processor 54 may perform analysis to adjust the operations of the respective well to move toward the desired operating point. For instance, the processor 54 may determine the current operating point of the respective well, compare the current operating point to a desired operating point, determine an amount of choke size to change to achieve the desired operating point, determine an adjustment for the tubing head pressure to achieve the desired operating point, determine an adjustment for the operating parameters of an artificial lift coupled to the respective well to achieve the desired operating point, and the like.

In addition to providing localized monitoring of various properties and control of operational parameters of a respective well, in certain embodiments, the monitoring system 26 may also serve as a net oil computer that may be used during a well test. The net oil computer may determine a net amount of hydrocarbons (e.g., oil), a net amount of water, a net amount of basic sediment and water (BS&W), and a net amount of gas that is produced by a respective well. Generally, the net oil computer may determine these properties of the respective well by performing a well test on the respective well. The well test may include sending a production flow output by a selected well into a test separator. As the hydrocarbons flow to into the test separator, the net oil computer may determine a well flow rate for the selected well. Upon receiving the hydrocarbons from the selected well, the test separator may divide the flow from the selected well into the streams of individual components such as oil, gas, and water. The net oil computer may then determine the flow rates for the oil, gas, and water components of the production of the selected well.

Keeping the foregoing in mind, FIG. 12 illustrates a block diagram of a net oil computer (NOC) system 260 that may be used in the hydrocarbon site 10. In certain embodiments, the NOC system 260 may control the operation of a well test procedure of a respective well and may analyze the flow of hydrocarbons being extracted from the respective well to determine when a well test should be performed on the respective well.

As shown in FIG. 12, the net oil computer (NOC) system 260 may include the monitoring system 26, which may include a net oil computer (NOC) component 262 and a multi-selector valve (MSV) control component 264 in addition to the components described above with reference to FIG. 3. In one embodiment, the NOC component 262 and the MSV control component 264 may be controllers disposed on the monitoring system 26. In another embodiment, the NOC component 262 and the MSV control component 264 may be logic or non-transitory computer-readable instructions that may perform operations such as computing a net amount of oil, water, gas, and BS&W content being extracted by a well and controlling a multi-selector valve (MSV) 266, respectively.

The MSV 266 may be a manifold or a multi-port valve that may be coupled to one or more outputs of one or more wells in the hydrocarbon site 10. As such, the MSV 266 may receive the fluids extracted from one or more wells coupled to the ports of the MSV 266. For example, FIG. 12 illustrates outputs of a well 268, a well 270, and a well 272 coupled to the MSV 266.

The MSV 266 may include internal piping that may collect all of the fluids received by the MSV 266 and output the combined fluids via an output pipe 274. As such, the MSV 266 may receive all of the fluids extracted from the well 268, the well 270, and the well 272 and may send the combined fluids to the network of pipelines 24 via the output pipe 274.

The internal piping of the MSV 266 may also be adjusted such that the fluids collected via one input port of the MSV 266 may be isolated and output to an a separate output pipe 276. For example, the internal piping of the MSV 266 may be aligned such that the fluids extracted from the well 268 are diverted to the separate output pipe 276, while the fluids extracted from the well 270 and the well 272 are combined and diverted to the output pipe 274.

The monitoring system 26 may be communicatively coupled to the multi-selector valve (MSV) 266 via the MSV control component 264. In certain embodiments, the MSV 266 may thus be controlled by the MSV control component 264. That is, the MSV control component 264 may send control signals to an actuator or motor associated with the MSV 266 to control the alignment of the internal piping of the MSV 266. In this manner, the MSV control component 264 may isolate the flow of fluids extracted by each well, such that each well may be well tested.

Keeping this in mind, when performing a well test for a respective well, the MSV control component 264 may divert the fluids extracted by the respective well to the output pipe 276. The output pipe 276 may be coupled to a test separator 278, which may be similar to the separator 20 described above. The test separator 278 may separate the fluids diverted to the output pipe 276 into oil, water, gas, and BS&W components. The NOC component 262 may be coupled to certain measurement devices, such as sensors or gauges, disposed on the test separator 278 and may receive data indicating the oil, water, gas, and BS&W content in the fluids extracted from a respective well. The data may also include a volumetric flow rate and pressure observed in the respective well. The NOC component 262 may then analyze the data to determine estimate measurements or virtual flow measurements of each component present in the hydrocarbons extracted from the respective well. The NOC component 262 may then determine flow rate data and/or gas oil ratio data that may be used to determine how the production of the respective well may be allocated and how to manage the reservoir coupled to the respective well.

By having the NOC component 262 and the MSV control component 264, the monitoring system 26 may locally initiate a well test for a respective well. That is, since the NOC component 262 and the MSV control component 264 are integrated into the monitoring system 26, which may be disposed at the well site, a well test may be performed at any given time. In certain embodiments, the monitoring system 26 may continuously monitor (e.g., every 10 minutes, 2 hours, 3 days, etc.) the properties of the fluids and determine whether the well test data for a respective well should be updated based on the monitored properties.

To monitor the properties of the fluids being extracted from each respective well, the NOC component 262 may receive data from a pressure sensor 280, a flow meter 282, and a water cut meter 284. The pressure sensor 280, the flow meter 282, and the water cut meter 284 may be coupled to the output pipe 276, which may include the isolated fluids being extracted from one particular well. The pressure sensor 280 may measure the pressure of the fluids or hydrocarbons being extracted by the respective well. The flow meter 282 may be a mass flow meter that may measure mass flow rate of the fluid traveling through the output pipeline 276. The mass flow rate may indicate an amount of mass of the fluid that may be traveling past a fixed point per unit time. In one embodiment, the flow meter 282 may be a Coriolis flow meter. The water cut meter 284 may measure an amount or cut of water content of may be present in the fluids in the output pipe 276.

In one embodiment, the NOC component 262 may receive data from pressure sensor 280, the flow meter 282, and the water cut meter 284 to estimate measurements of two fluid phases of the hydrocarbons being extracted from the respective well. The two fluid phase measurements may include a calculation of an instantaneous total volume of water and oil in the extracted fluids from the respective well during some amount of time. The monitoring system 26 may store the fluid phase measurements in the memory 56 or the storage 58. The monitoring system 26 may also transmit the fluid phase measurements and/or the raw data received from the pressure sensor 280, the flow meter 282, and the water cut meter 284 to the gateway 72.

By incorporating the MSV control component 264 and the NOC component 262 into the monitoring system 26, the monitoring system 26 may provide an automated process for performing a well test on any well coupled to the MSV 266. Further, since the NOC component 262 is coupled to the pressure sensor 280, the flow meter 282, and the water cut meter 284, the monitoring system 26 may monitor certain properties of the fluids being extracted from a respective well. The monitoring system 26 may also depict the monitored properties of the extracted fluids on the display 62 or transmit the properties to an electronic device as discussed above. As such, the well site operator may be better equipped to make various determinations regarding the operating parameters of the respective well.

Keeping the foregoing in mind, FIG. 13 illustrates a flow chart of a method 300 for automatically performing a well test for a respective well. At block 302, the NOC component 262 may receive real-time or near real-time data associated with a respective well. The real-time data may corresponds to the properties of the hydrocarbons being extracted from the respective well as routed via the MSV 266 and the output pipe 276. As such, the NOC component 262 may send a command to the MSV 266 via the MSV control component 264 to adjust the internal piping of the MSV 266 to couple the output of the respective well to the output pipe 276.

Upon receiving the command, the MSV 266 may align the internal piping such that the internal pipe or valve of the MSV 266 is aligned to direct the flow of the hydrocarbons extracted from the respective well to the output pipe 276. As the hydrocarbons from the respective well are flowing through the output pipe 276, the NOC component 262 may receive the real-time data as mentioned above.

The real-time data may include wellhead real-time data such as tubing head pressure, tubing heat temperature, casing head pressure, casing head temperature, flowline pressure, flowline temperature, choke size, and the like. Referring briefly back to FIG. 12, the real-time data may also include the data acquired by the pressure sensor 280, the flow meter 282, and the water cut meter 284. As such, the NOC component 262 may also receive data related to the pressure of the fluids or hydrocarbons being extracted by the respective well, a mass flow rate of the fluids, and an amount or cut of water content of may be present in the fluids.

In addition to the data described above, the NOC component 262 may also receive real-time data from other devices that may be available at the well site or in the hydrocarbon site 10, such as a water fraction amount, an oil fraction amount, an oil density value, a gas density value, a water density value and the like. In one embodiment, the NOC component 262 may estimate the amount or cut of water content in the fluids based on the mass flow rate of the fluids, the density of the water in the fluids, and the density of the hydrocarbons (e.g., oil) in the fluids.

At block 304, the NOC component 262 may perform virtual flow metering calculations with respect to the fluids in the output pipe 276 based on the real-time data acquired at block 302. The virtual flow metering calculations may include calculations of an oil flow rate, a gas flow rate, a water flow rate, and the like of the fluids in the output pipe 276.

At block 306, the NOC component 262 may determine whether the virtual flow metering results are substantially similar (e.g., within 5%) to the results determined during a well test for the respective well. For example, the NOC component 262 may determine whether the oil flow rate, the gas flow rate, and the water flow rate of the fluids in the output port 276 substantially match the oil flow rate, the gas flow rate, and the water flow rate specified in the well test data for the respective well. As such, the NOC component 262 may retrieve the well test data for the respective well from the memory 56, the storage 58, from other monitoring system 26, the gateway device 72, the control system 76, the network 78, or the like.

If the virtual flow metering results are substantially similar to the results determined during the well test for the respective well, the NOC component 262 may proceed to block 308. At block 308, the NOC component 262 may send a signal to the MSV 266 via the MSV controller 264 to change its internal piping, such that fluids from another well are diverted into the output pipe 276. The NOC component 262 may then perform the method 300 again with respect to the well that corresponds to the hydrocarbons flowing through the output pipe 276. In one embodiment, the NOC component 262 may wait for a certain amount of time to expire before performing the method 300 again to ensure that the fluids present in the output pipe 276 correspond to the respective well coupled to the output pipe 276 and does not include any remnants of the fluids from the well previously coupled to the output pipe 276.

Although the method 300 is described above with block 308, it should be noted that in certain embodiments, the NOC component 262 may omit the block 308 and proceed directly to block 302. As such, the NOC component 262 may continuously monitor the properties of one particular well.

Referring back to block 306, if the virtual flow metering results are not substantially similar to the results determined during the well test for the respective well, the NOC component 262 may proceed to block 310. At block 310, the NOC component 262 may perform a new well test for the respective well. As such, the NOC component 262 may send a command to the test separator 278 to separate the fluids in the output pipe 276 produced from respective well into separate gas and liquid components. The test separator 278 may include certain gauges or sensors that may sense the amounts of gas and liquid components that have been separated by the test separator 278. The NOC component 262 may be communicatively coupled to these gauges or sensors and may receive the data acquired by the gauges and sensors. As such, using the amounts of gas and liquid components present in the fluids of the output pipe 276, the NOC component 262 may determine the updated well test data for the respective well. That is, the NOC component 262 may determine the oil flow rate, the gas flow rate, and the water flow rate, for example, of the hydrocarbons being extracted from the respective well.

After performing the well test for the respective well, the NOC component 262 may store the well test data in the memory 56, the storage 58, and the like. The NOC component 262 may also transmit the well test data for the respective well to other monitoring systems 26, the gateway device 72, the control system 76, the network 78, or the like. In one embodiment, the NOC component 262 may then proceed to block 308 and send a signal to the MSV 266 via the MSV controller 264 to change its internal piping, such that fluids from another well are diverted into the output pipe 276. As mentioned above, the NOC component 262 may then perform the method 300 again with respect to the well that corresponds to the hydrocarbons flowing through the output pipe 276.

As discussed above, although the method 300 is described above with block 308, it should be noted that in certain embodiments, the NOC component 262 may omit the block 308 and proceed directly to block 302. As such, the NOC component 262 may continuously monitor the properties of one particular well.

In certain embodiments, the NOC component 262 may not perform block 310 of the method 300. Instead, the NOC component 262 may send an alarm to the display 62, the gateway device 72, the control system 76, or the like indicating that the virtual flow metering results do not match the well test data and that the well test data should be updated for the respective well.

When the NOC component 262 performs the method 300, the NOC component 262 may be operate in a well test mode. In certain embodiments, the NOC component 262 may operate in a continuous operation mode and perform just blocks 302 and 304. That is, the NOC component 262 may not analyze whether the virtual flow metering results are substantially similar to the results determined during the well test for the respective well at block 306. Instead, the NOC component 262 may display the virtual flow metering results determined at block 304 on the display 62. The NOC component 262 may also transmit the virtual flow metering results to an electronic device, the gateway 72, the control system 76, the network 78, or the like.

In certain embodiments, the NOC component 262 may perform the method 240 of FIG. 11 in conjunction with the well test mode or the continuous operation mode discussed above. As such, the NOC component 262 may display the virtual flow metering results determined at block 304 on the display 62 and/or transmit the virtual flow metering results to an electronic device, the gateway 72, the control system 76, the network 78, or the like when operating in the low power mode. If the virtual flow metering results are transmitted to the gateway device 72 or the control system 76, the gateway device 72 or the control system 76 may perform the subsequent blocks of the method 300, thereby enabling the NOC component 262 to conserve its processing power.

Otherwise, the NOC component 262 may perform the method 300, including block 306, during the continuous-power mode. That is, since the NOC component 262 may use certain amounts of power to drive various components to control the test separator 278 and the MSV 266, the NOC component 262 may perform these tasks when a continuous power source may be available to the monitoring system 26 or the like.

By continuously monitoring the flow properties of a respective well, the NOC component 262 may perform well tests more efficiently. That is, well tests are generally performed periodically based on the expiration of time (e.g., one month). However, the properties related to the hydrocarbons being produced from the respective well may change as the hydrocarbons are being extracted from the reservoir. Therefore, it may be useful to perform well tests on a respective well when the hydrocarbon properties change from the hydrocarbon properties specified in the respective well test.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a multi-selector valve configured to couple to one or more outputs of one or more wells configured to extract hydrocarbons from one or more hydrocarbon reservoirs of the one or more wells, wherein the multi-selector valve is configured to divert a first flow of hydrocarbons extracted from a first well into an output pipe;
   a separator configured to couple to the output pipe and configured to separate the first flow of hydrocarbons into gas and liquid components; and
   a monitoring device configured to communicatively couple to the multi-selector valve and the separator, wherein the monitoring devices is configured to:
   receive a first set of data associated with the first flow of hydrocarbons from the first well in the output pipe;
   determine one or more virtual flow rates of the liquid and gas components of the first flow hydrocarbons based on the first set of data;
   determine whether the one or more virtual flow rates of the liquid and gas components substantially match one or more flow rates of the liquid and gas components determined during a previous well test for the first well;
   send a first signal to the multi-selector valve to divert the first flow of hydrocarbons to the separator to perform a well test for the first well in response to determining when the one or more virtual flow rates of the liquid and gas components do not substantially match the one or more flow rates of the liquid and gas components determined during a previous well test for the first well; and
   send a second signal to the multi-selector valve to divert a second flow of hydrocarbons extracted from a second well to the output pipe in response to determining when the one or more virtual flow rates of the liquid and gas components substantially match the one or more flow rates of the liquid and gas components determined during the previous well test for the first well.

2. The system of claim 1, comprising:
   a pressure sensor configured to measure a pressure of the first flow of hydrocarbons; and
   a flow meter configured to measure a mass flow rate of the first flow of hydrocarbons, wherein the first set of data comprises the pressure and the mass flow rate.

3. The system of claim 2, comprising a water cut meter configured to measure an amount of water present in the first flow of hydrocarbons, wherein the first set of data comprises the amount of water.

4. The system of claim 1, wherein the first set of data comprises tubing head pressure, tubing heat temperature, casing head pressure, casing head temperature, flowline pressure, flowline temperature, choke size, a water fraction amount, an oil fraction amount, an oil density value, a gas density value, a water density value, or any combination thereof.

5. The system of claim 1, wherein the monitoring device is configured to perform the well test by:
   sending a command to the separator to separate the first flow of hydrocarbons into the liquid and gas components;
   receiving a second set of data associated with the liquid and gas components; and
   determining one or more current flow rates of the liquid and gas components of the first flow of hydrocarbons.

6. The system of claim 1, wherein the monitoring device is configured to adjust an alignment of internal piping of the multi-selector valve.

7. The system of claim 1, wherein the monitoring device is configured to receive a second set of data associated with the second flow of hydrocarbons in the output pipe after an amount of time expires from when the multi-selector valve diverted the second flow of hydrocarbons to the output pipe.

8. A method, comprising:
   receiving, at a processor, a first set of data associated with a first flow of hydrocarbons from a first hydrocarbon well directed into an output pipe via a multi-selector valve configured to couple to one or more outputs of one or more hydrocarbon wells;
   determining, at the processor, one or more virtual flow rates of liquid and gas components of the first flow of hydrocarbons based on the first set of data;
   determining, at the processor, whether the one or more virtual flow rates of the liquid and gas components substantially match one or more flow rates of the liquid and gas components determined during a previous well test for the first hydrocarbon well; and
   sending, at the processor, a signal to the multi-selector valve to direct the first flow of hydrocarbons to a separator coupled to the output pipe in response to determining that the one or more virtual flow rates of the liquid and gas components do not substantially match the one or more flow rates of the liquid and gas components determined during the previous well test, wherein the separator is configured to perform a well test for the first hydrocarbon well.

9. The method of claim 8, wherein the one or more virtual flow rates comprise an oil flow rate of the first flow of hydrocarbons, a gas flow rate of the first flow of hydrocarbons, a water flow rate of the first flow of hydrocarbons, or any combination thereof.

10. The method of claim 8, wherein receiving, at the processor, the first set of data comprises:
   receiving, at the processor, a pressure of the first flow of hydrocarbons from a pressure sensor configured to couple to the output pipe; and
   receiving, at the processor, a mass flow rate of the first flow of hydrocarbons from a flow meter configured to couple to the output pipe.

11. The method of claim 10, comprising estimating, at the processor, an amount of water present in the first flow of hydrocarbons based on the mass flow rate, a density of water in the first flow of hydrocarbons, and a density of the oil in the first flow of hydrocarbons.

12. The method of claim 8, comprising:
   receiving, at the processor, a second set of data associated with the liquid and gas components;
   determining, at the processor, one or more current flow rates of the liquid and gas components of the first flow of hydrocarbons; and
   storing, at the processor, the one or more current flow rates in a memory as updated well test data.

13. The method of claim 8, comprising sending, at the processor, a second signal to the multi-selector valve to direct a second flow of hydrocarbons from a second hydrocarbon well to the output pipe in response to determining that the virtual flow rates of the one or more liquid and gas components substantially match the one or more flow rates of the one or more liquid and gas components determined during the previous well test for the first hydrocarbon well.

14. An electronic device, comprising:
   an input/output port configured to receive a first set of data from one or more sensors disposed on an output pipe configured to receive a first flow of hydrocarbons from a first hydrocarbon well of a plurality of hydrocarbon wells, wherein a plurality of outputs of the plurality of hydrocarbon wells is configured to couple to a multi-selector valve configured to isolate the flow of the first hydrocarbon well to the output pipe via an internal piping system; and
   a processor configured to:
      determine one or more virtual flow rates of one or more liquid and gas components of the first flow of hydrocarbons based on the first set of data;
      transmit the one or more virtual flow rates to a gateway device configured to determine whether the one or more virtual flow rates of the one or more liquid and gas components substantially match one or more flow rates of the one or more liquid and gas components determined during a previous well test for the first hydrocarbon well;
      send a signal to a multi-selector valve control system to cause the first flow of hydrocarbons to route to a separator configured to separate the first flow of hydrocarbons into the one or more liquid and gas components and perform a well test in response to the gateway device determining that the virtual flow rates of the one or more liquid and gas components do not substantially match the one or more flow rates of the one or more liquid and gas components determined during the previous well test for the first hydrocarbon well, wherein the separator is coupled to the output pipe;
      receive a second set of data associated with the one or more liquid and gas components separated from the first flow of hydrocarbons by the separator; and
      determine one or more updated flow rates of the one or more liquid and gas components separated from the first flow of hydrocarbons based on the second set of data.

15. The electronic device of claim 14, comprising a display device configured to communicatively couple to the processor, wherein the processor is configured to display the one or more virtual flow rates on the display device.

16. The electronic device of claim 14, wherein the processor is configured to initiate an alarm for the first hydrocarbon well in response to determining when the one or more virtual flow rates of the one or more liquid and gas components do not substantially match the one or more flow rates of the one or more liquid and gas components determined during the previous well test for the first hydrocarbon well.

17. The electronic device of claim 14, wherein the multi-selector valve control system is configured to control one or more operations of the multi-selector valve.

18. The electronic device of claim 14, wherein the processor is configured to send a second signal to the multi-selector valve control system to cause a second flow of hydrocarbons from a second hydrocarbon well of the plurality of hydrocarbon wells to route the output pipe after determining the one or more updated flow rates of the one or more liquid and gas components.

19. The electronic device of claim 14, wherein the processor is configured to store the one or more updated flow rates of the one or more liquid and gas components in a memory after determining the one or more updated flow rates.

20. The electronic device of claim 14, wherein the processor is configured to transmit the one or more updated flow rates of the one or more liquid and gas components to the gateway device after determining the one or more updated flow rates.

* * * * *